US008235778B2

(12) United States Patent
Takahashi et al.

(10) Patent No.: US 8,235,778 B2
(45) Date of Patent: Aug. 7, 2012

(54) GAME APPARATUS, GAME SYSTEM AND GAME PROGRESSION CONTROL METHOD

(75) Inventors: Naoki Takahashi, Kobe (JP); Daisuke Chiba, Kobe (JP); Satoshi Uchiyama, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1123 days.

(21) Appl. No.: 11/920,825

(22) PCT Filed: May 22, 2006

(86) PCT No.: PCT/JP2006/310145
§ 371 (c)(1),
(2), (4) Date: Jan. 7, 2008

(87) PCT Pub. No.: WO2006/126484
PCT Pub. Date: Nov. 30, 2006

(65) Prior Publication Data
US 2009/0137296 A1    May 28, 2009

(30) Foreign Application Priority Data

May 25, 2005   (JP) .................................. 2005-152996

(51) Int. Cl.
*A63F 13/00* (2006.01)
(52) U.S. Cl. ................... 463/3; 463/40; 463/42
(58) Field of Classification Search .......... 463/1–7, 463/16–43; 273/292, 138.1
See application file for complete search history.

(56) References Cited

U.S. PATENT DOCUMENTS

| 5,601,487 | A | 2/1997 | Oshima et al. | |
|---|---|---|---|---|
| 6,244,956 | B1 * | 6/2001 | Nakayama et al. | 463/3 |
| 6,270,413 | B1 * | 8/2001 | Aikawa et al. | 463/31 |
| 6,394,894 | B1 * | 5/2002 | Okitsu et al. | 463/3 |

(Continued)

FOREIGN PATENT DOCUMENTS

EP            1 279 424         1/2003

(Continued)

OTHER PUBLICATIONS

"Battleship (game)", article on wikipedia http://en.wikipedia.org/wiki/Battleship_(game) Published in 1943.

(Continued)

*Primary Examiner* — Masud Ahmed
(74) *Attorney, Agent, or Firm* — Jordan and Hamburg LLP

(57) ABSTRACT

Disclosed is a game system capable of introducing a distinctive feature into each of a processing of designating offensive and defensive locations and a processing of determining a competition result so as to provide a game having a high level of playability. The game system comprises a plurality of game apparatuses each equipped with a touch panel 10 and a monitor 3, and connected to each other via a network. Each of the game apparatuses includes an image display control section 302 adapted to display a strike zone image (SZ image) on the monitor 3, and a setup section 304 adapted, based on manipulation information accepted from the touch panel 10, to set up a pitch location (or swing location) within the SZ image, and set up a shape of a first mark image on the basis of the setup location. The image display control section 302 is also adapted to display the first mark image on the SZ image in a superimposed manner, and, after completion of the setup processing by the setup section 304, display, onto the SZ image, a second mark image for the swing location (or pitch location) which is received from an opponent's game apparatus. The game apparatus further includes a batting result-setting section 307 adapted to set a batting result depending on a degree of overlapping between the first and second mark images.

17 Claims, 20 Drawing Sheets

U.S. PATENT DOCUMENTS

| | | | |
|---|---|---|---|
| 6,482,090 B1* | 11/2002 | Rimoto et al. | 463/31 |
| 2001/0044333 A1 | 11/2001 | Okishio et al. | |
| 2002/0107058 A1* | 8/2002 | Namba et al. | 463/3 |
| 2003/0003977 A1* | 1/2003 | Takahashi et al. | 463/3 |
| 2003/0017863 A1* | 1/2003 | Takahashi et al. | 463/3 |

FOREIGN PATENT DOCUMENTS

| | | |
|---|---|---|
| GB | 2 351 547 | 11/2001 |
| JP | 2000-167252 | 6/2000 |
| JP | 2001-038045 | 2/2001 |
| JP | 2003-071136 | 3/2003 |
| JP | 2004-236863 | 8/2004 |

OTHER PUBLICATIONS

"Battleship", article on boardgamegeek http://www.boardgamegeek.com/boardgame/2425/battleship Published in 1931.

* cited by examiner

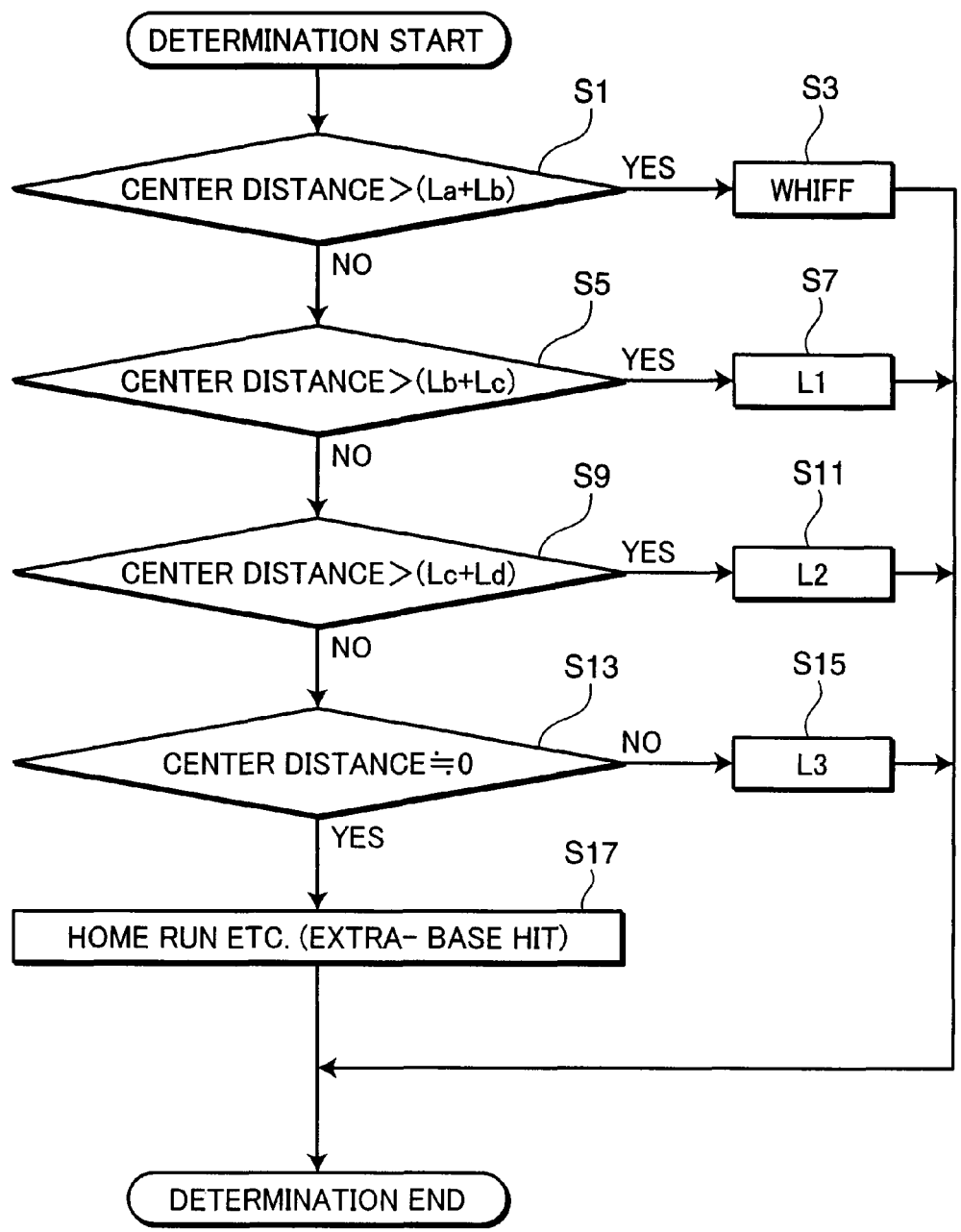

GAME APPARATUS, GAME SYSTEM AND
GAME PROGRESSION CONTROL METHOD

TECHNICAL FIELD

The present invention relates to a game apparatus, a game system and a game progression control method which are designed to progress a competition game configured to allow player's and opponent's characters displayed on a display unit to alternately play on offensive and defensive sides through a game medium, based on manipulation information accepted from a manual operation section.

BACKGROUND ART

A video game is marketed which is configured to simulate a baseball in such a manner that two game players operates their own game apparatuses to give instructions for action to characters of their own teams so as to allow the characters of the two teams to alternately play on offensive and defensive sides. This type of video game is configured to be progressed according to two game players' instructions for offensive and defensive actions of offensive-side and defensive-side characters, typically pitcher and batter characters display on a monitor.

However, an instruction for a pitch location of a pitcher side or a swing location (batting location) of a batter side is given in such a manner as to simply select one of a plurality of pre-set grids (subareas), and a processing of determining a batting result is executed according to a simple rule. For example, a strike zone is virtually indicated above a home base on an image screen while dividing the strike zone vertically and horizontally into nine subareas of 3 rows×3 columns, to allow each of the two game players to select either one of the subareas so as to designate a pitch or swing location. This game apparatus is designed to determine a batting result depending on whether respective subareas designated by the two players coincide with each other.

In the above game apparatus, a batting result is determined based on coincidence or non-coincidence between results of two players' selections on the nine divided subareas of the strike zone. For example, the batting result is processed as "hit" in response to coincidence between the selections, and processed as "whiff" or "out" in response to non-coincidence between the selections. Thus, each of the game players is required to predict opponent's designation and select a pitch or swing location based on the prediction. In this regard, a certain level of playability can be appreciated. However, the mode for location selection and the processing mode for determining a batting result based on two player's selection results do not reach a satisfactory level of playability expected by game players. Moreover, these modes are not sufficient in terms of excitement/enjoyment and unexpectedness, and thereby game players are likely to lose interest in the game.

In view of the above problems, it is an object of the present invention to introduce a distinctive feature into each of a processing of designating offensive and defensive locations and a processing of determining a competition result in a competition-type role-playing game, so as to provide a game apparatus, a game system and a game progression control method which have a high level of playability.

DISCLOSURE OF THE INVENTION

In order to solve the above problems, the present invention provides a game system which comprises game-progression processing means operable, according to communication about manipulation information between a plurality of game apparatuses each equipped with a manual operation section manipulatable from outside, a display unit and communication means, via a network, to progress a completion-type role-playing game configured to allow a player's character and an opponent's character displayed on the display unit in each of the game apparatuses to alternately play on offensive and defensive sides through a game medium. In this game system, each of the game apparatuses includes: area-graphic display control means adapted to display, on the display unit, an area graphic having a predetermined shape which virtually represents a predetermined range in a game space; setup means adapted, based on manipulation information accepted from the manual operation section, to set up one of offensive and defensive locations within the area graphic, and set up a shape of a first mark image on the basis of the setup location; mark display control means adapted to display, onto the area graphic, the first mark image set up by the setup means, and, after completion of the setup processing by the setup means, display, onto the area graphic, a second mark image which is received from the opponent's game apparatus through the communication means, and set up in a predetermined shape on the basis of the other one of the offensive and defensive locations which is set up in the area graphic; and competition result-setting means adapted to set a competition result depending on a degree of overlapping between the first and second mark images.

Preferably, the game system of the present invention is applied to a role-playing game configured to simulate a baseball in such a manner that a pitcher character throws a ball character configured to simulate a ball so as to serve as the game medium, and a batter character swings a bat character configured to simulate a bat. In this case, the area graphic is configured to virtually represent an area corresponding to a strike zone above a home base in the game space. The offensive location is a swing location for the bat character within the area graphic, and the defensive location is a pitch location for the ball character within the area graphic. Further, the competition result is a batting result.

In the game system, each of the game apparatuses is equipped with the manual operation section manipulatable from outside, the display unit and the communication means. The game apparatuses are connected to a network in such a manner as to allow communication about manipulation information therebetween, and a completion-type role-playing game configured to allow a player's character and an opponent's character displayed on the display unit according to a computer in each of the game apparatuses to alternately play on offensive and defensive sides through the game medium, e.g., a game configured to simulate a baseball, is progressed. The area-graphic display control means in the player's game apparatus is operable to display, on the display unit, the area graphic having a predetermined shape which virtually represents a predetermined range in a game space. Then, the setup means in the player's game apparatus is operable, based on manipulation information accepted from the manual operation section, to set up one of offensive and defensive locations (in a baseball game, the defensive location means a position above a home base through which a pitched ball character will pass, and the offensive location means a position above the home base through which a swung bat character will pass) within the area graphic, and set up a shape of the first mark image on the basis of the setup location.

Then, the mark display control means in the player's game apparatus is operable to display, onto the area graphic, the first mark image set up by the setup means, and, after completion of the setup processing by the setup means, display, onto the area graphic, the second mark image which is received from the opponent's game apparatus through the communication means, and set up in a predetermined shape on the basis of the other one of the offensive and defensive locations (in the baseball game, a swing location and a pitch location) which is set up in the area graphic. Then, the competition result-setting means in the player's game apparatus adapted is operable to set a competition result (in the baseball game, a batting result) depending on a degree of overlapping between the first and second mark images.

As above, the competition result is set depending on a degree of detected overlapping between the first mark image having a predetermined shape set up on the basis of one location for a player side, i.e., an offensive side or a defensive side (in the baseball game, a pitcher side or a batter side), and the second mark image having a predetermined shape set up on the basis of the other location designated by an opponent who operates (manipulates) the opponent's game apparatus and received through respective communication means of the opponent's and player's game apparatuses. Thus, prediction (sherlocking) about location designated by an opponent provides enhanced excitement/enjoyment. In addition, as compared with the conventional game system, the competition result (in the baseball game, a batting result) can be more precisely set to provide a realistic game capable of keeping players interested.

BRIEF DESCRIPTION OF THE DRAWINGS

FIG. 3B is a schematic diagram showing a mark which is marked on a botton surface of the athlete card.

FIG. 9 is a flow chart showing a processing of determining a hitting level for an overlapping degree.

BEST MODE FOR CARRYING OUT THE INVENTION

Figure 1:
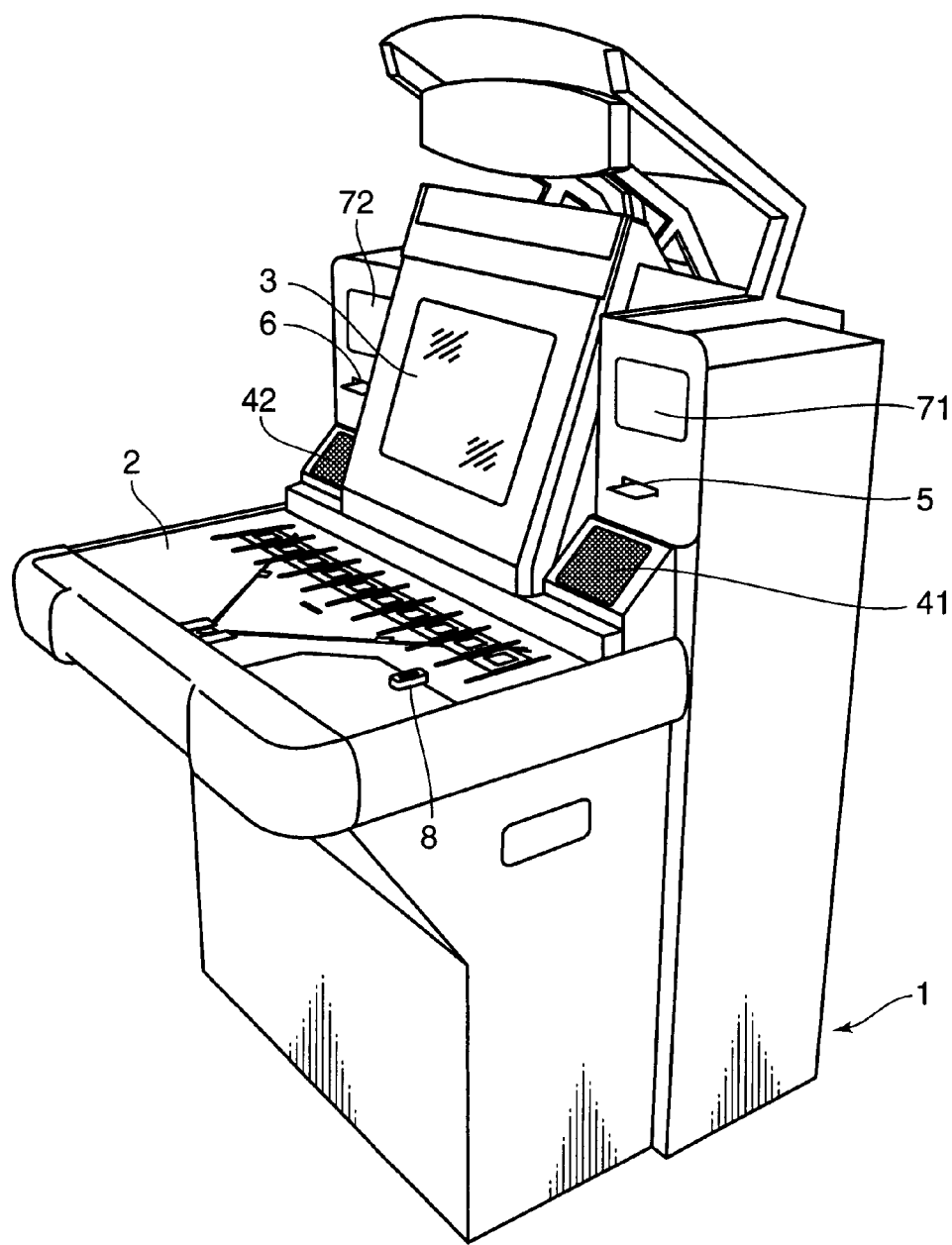
FIG. 1 is a schematic external view showing a game apparatus according to one embodiment of the present invention.

FIG. 1 is a schematic external view showing a game apparatus according to one embodiment of the present invention. This game apparatus comprises a housing 1 with a predetermined three-dimensional structure, for example, having an approximately rectangular parallelepiped shape. The housing 1 is formed with a card-mounting section 2 in an approximately central region of a front surface thereof. The card-mounting section 2 has a mounting surface 20 (see FIG. 2) for allowing to a player (i.e., game player) to mount thereon an athlete card with a predetermined shape. The housing 1 is provided with a monitor 3, such as a CRT display unit or a liquid-crystal display unit, which is adapted to display a game image thereon and disposed on an upper side of the card-mounting section 2, and a pair of speakers 41, 42 adapted to output audio and produce sound effects and disposed on right and left sides of the monitor 3, respectively. The housing 1 also includes a personal-card loading slot 5 formed on an upper side of one of the right and left speakers 41, 42 (in this embodiment, on an upper side of the right speaker 41), and an athlete-card issue slot 6 formed on an upper side of the left speaker 42. Further, the housing 1 is provided with a pair of light-emitting sections 71, 72 adapted to produce illumination effects and disposed on respective upper sides of the personal-card loading slot 5 and the athlete-card issue slot 6. The card-mounting section 2 is formed with a coin input slot 8 for guiding a coin input which is a condition for starting a game, at a predetermined position thereof.

Figure 2:
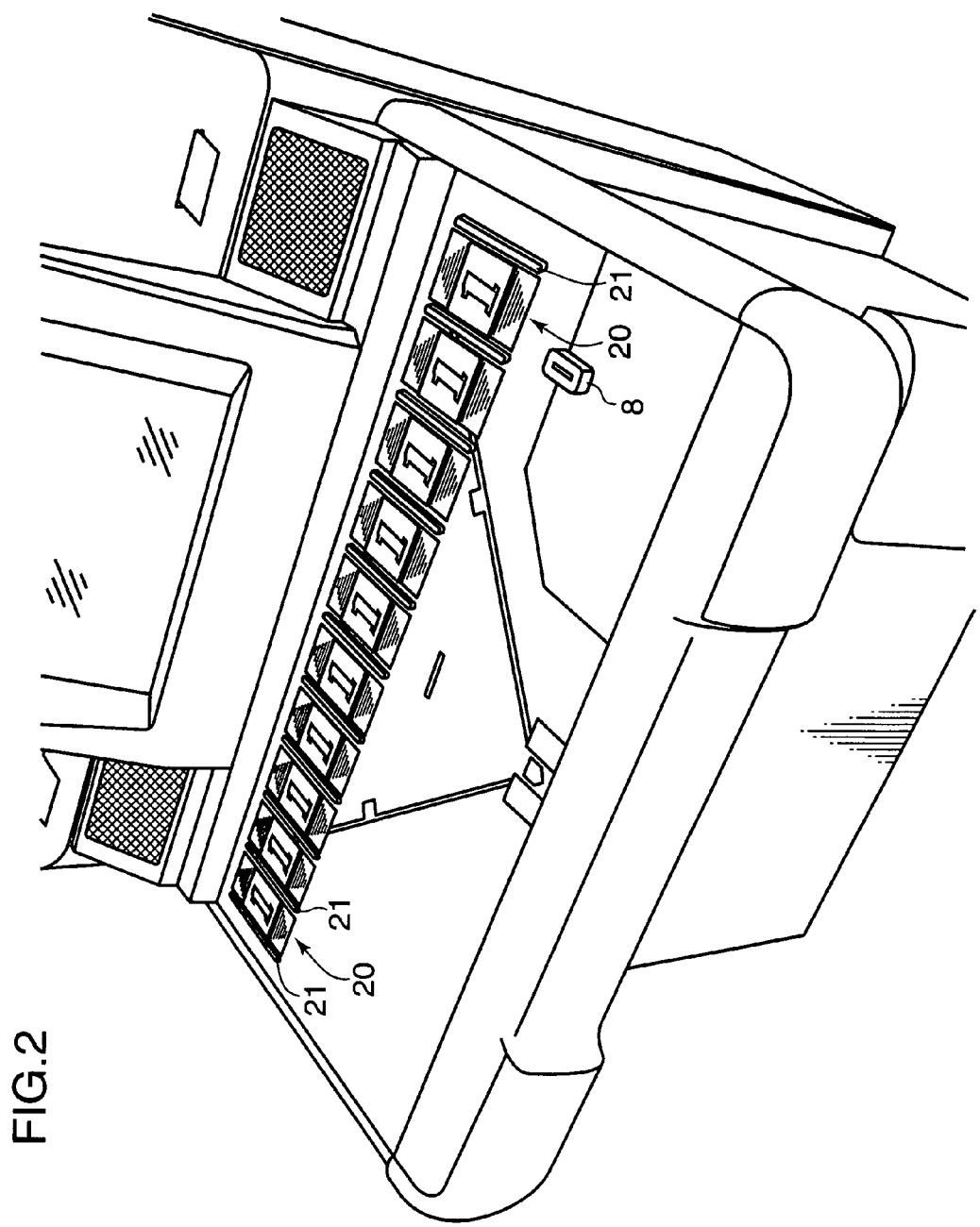
FIG. 2 is a perspective view showing one example of the configuration of a card-mounting section.

FIG. 2 is a perspective view showing one example of the configuration of the card-mounting section 2. The card-mounting section 2 has an upper surface formed in a predetermined shape (in this embodiment, a quadrilateral shape) to extend horizontally and flatly. The game apparatus according to this embodiment is designed to simulate a baseball game, and therefore a picture simulating a playing field of a baseball stadium is drawn on the card-mounting section 2. As the athlete card 9, a predetermined shaped card may be employed, and a rectangular-shaped card is employed in this embodiment, as shown in FIG. 3A. In the card-mounting section 2, the mounting surface 20 is provided in a plural number to allow a plurality (in this embodiment, ten) of the athlete cards to be mounted thereon at predetermined intervals along a rightward/leftward (i.e., lateral) direction thereof. Each of the mounting surfaces 20 is formed to have a width dimension corresponding to that of the athlete card 9. The mounting surface 20 is formed with a guide member on right and left sides thereof to serve as an assist member for guiding the athlete card 9 to facilitate a sliding movement of the athlete card 9 from a loading position in a primary direction, for example, in a frontward/rearward (i.e., longitudinal) direction. For example, the guide member consists of a pair of convex strip-shaped members 21 extending in a sliding direction (in this embodiment, the longitudinal direction) in spaced-apart relation to each other by the width dimension of the athlete card 9. Each of the convex strip-shaped members 21 has a longitudinal dimension set to be equivalent to a sliding range of the athlete card 9.

Figure 3B:
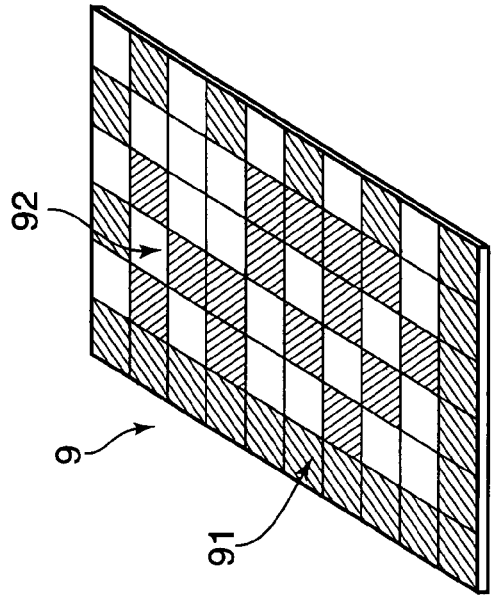
FIG. 3B is a schematic diagram showing a mark which is marked on a bottom surface of the athlete card.
Figure 3A:
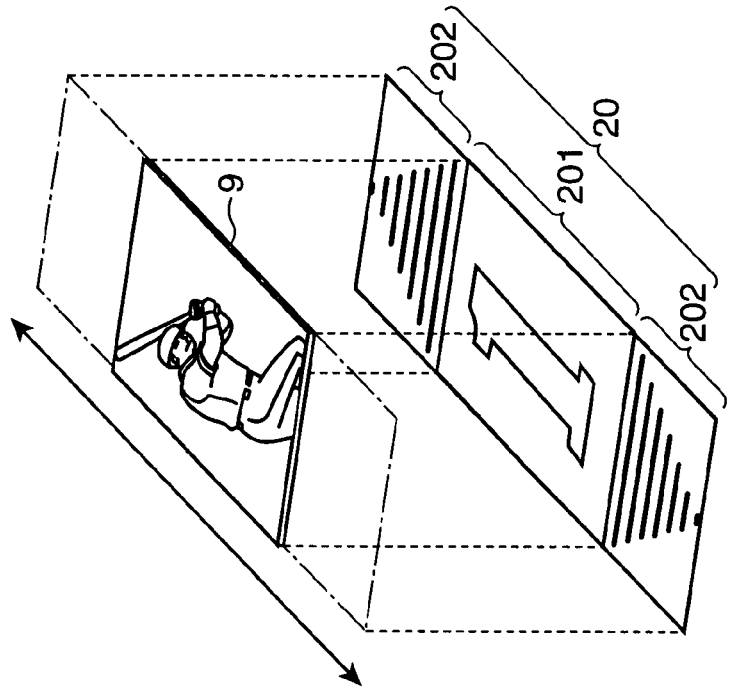
FIG. 3A is a perspective view showing the configuration of the athlete card and the relationship with the mounting surface.

FIG. 3 illustrates the configuration of the athlete card and a relationship with the mounting surface, wherein FIG. 3A is a perspective view showing the configuration of the athlete card and the relationship with the mounting surface, and FIG. 3B is a schematic diagram showing a mark which is marked on a bottom surface of the athlete card. In FIG. 3A, the athlete card 9 is illustrated in a floated state relative to the mounting surface 20, for facilitating understanding. As shown in FIG. 3A, the mounting surface 20 has a central region 201, and front and rear sliding regions 202. The central region 201 has the same size as that of the athlete card 9, and each of the sliding regions 202 has a desired longitudinal dimension relative to the central region. For example, the dimension of the sliding region 202 may be set to be approximately one-half of a longitudinal length of the athlete card. The sliding regions 202 are provided as a means to allow the athlete card 9 to be mounted while being offset (slidingly moved) relative to the central region 201 in the range indicated by the arrow, so as to provide variations in mode of an after-mentioned action of a character to be displayed on the monitor 3 correspondingly to the athlete card 9, as will be described in detail later. The athlete card 9 has a top surface printed with an athlete character image, and a bottom surface printed with visible information about an athlete, such as a photographic image of athlete's face and athlete's name, and invisible athlete identification data.

As shown in FIG. 3B, a mark printed on the bottom surface of the athlete card 9 includes a position detection mark 91 for detecting a card-mounted position where the athlete card 9 is mounted on the mounting surface 20, and a character mark 92 representing character data (hereinafter referred to as "parameter", and variously described, for example, as a fielder parameter, a pitcher parameter and a batter parameter, depending on its content) which is identification data of an athlete character corresponding to each of the athlete cards 9. An identification number may be used as the athlete identification data. For the sake of simplifying explanation, in this embodiment, the athlete card 9 is divided into sixty areas consisting of 6 columns×10 rows, wherein peripheral areas are used as the position detection mark 91, and the remaining inward thirty two areas consisting of 4 columns×8 rows are used as the character mark 92. In practice, the athlete card 9 is divided into a plurality of areas consisting of an adequate number of columns and rows required for storing intended data.

As the position detection mark 91, a predetermined material is attached on all the areas in adjacent two of four peripheral edges thereof, and every other ones of areas in the two remaining column-wise and row-wise peripheral edges, through a coating process or the like. That is, the position detection mark 91 consists of the continuous region, and the alternate region. This makes it possible to detect that the athlete card is erroneously mounted back to front, so as to reliably perform the position detection in a correct orientation of the athlete card.

As to the character mark 92, the athlete identification data is created by attaching the predetermined material on specific ones of the areas (each serving as one bit) on the inward side relative to the areas in the four peripheral edges, through a coating process or the like. The character data (parameters) of entire athletes are essentially pre-stored in a desired memory section of the game apparatus, in associated relation with the athlete identification data. Then, during a course of the game, one of the athlete parameters which is pre-stored in the memory section and identified by the athlete identification data obtained through a reading operation of the athlete card 9 is read from the memory section and used.

The coating material may be a visible material. In this embodiment, an invisible material, such as a material sensitive to infrared light, is use as the coating material, because infrared-light detection means is employed as will be described in detail later. As one example, the athlete card 9 is made of an infrared-light absorbing material, or the bottom surface of the athlete card 9 is coated with an infrared-light absorbing material, and then the position detection mark is marked thereon. Further, at least the mounting surface 20 of the card-mounting section 2 is made of a material transparent to infrared light.

The character mark 92 indicates identification information for identifying a corresponding athlete character, and an ability (including skills) of the athlete character. For example, in a batter (hitter) character, the ability includes, as a common item, fielder parameters (including batter parameters), such as "trajectory of batted ball (or hitting distance)", "bat control (hittability)", "swing power", "running ability", "throw distance", "defensive skill", "error-free level" and "main fielding position". Further, the ability includes, as a specific ability item in each of the characters, fielder parameters, such as "intimidating power", "bat control correction against left-handed pitcher", "hitting power correction against left-handed pitcher", "correction in chance", "swing timing", "average hitter", "power hitter", "table-setter", "winning hitter", "coping with adversity", "hitting to opposite field", "spray-hitting style", "infield single", "bunt skill", "grand-slam hitter", "pinch hitter", "strikeout leader", "first-pitch swinger", "multi-hit", "hitting streak", "cleanup batter", "back-to-back home run hitter", "tenacious player", "glove man", "stolen base leader", "hard-charging", "base running", "home base-sliding", "throwing", "blocking", "ability to inspire other players", "run-scoring error", "leadoff home run hitter in first inning", "pitcher-leading level of catcher", "laser-beam throw (quick throw-in)" and "tackle (representing forcefulness or vitality)".

In a pitcher character, the ability includes, as a common item, pitcher parameters, such as "pitched-ball speed"; "level of slider", "level of curveball", "level of fork-ball", "level of sinker" and "screwball" (i.e., level of breaking ball); "ball control"; "velocity of fastball"; "physique"; "adjusting ability as starting pitcher"; and "reconditioning ability". Further, the ability includes, as a specific ability item in each of the characters, pitcher parameters, such as "intimidating power", "correction against left-handed batter", "toughness in pinch", "toughness against hits", "coping with base runner", "level of initial pitching", "getting a boost in last innings", "emergency pitching start", "ball release", "acceleration of pitched ball", "luckiness in games", "pickoff throw", "response to batted ball", "tetchiness", "rate of four wide ones", "rate of mistake pitches", "quick pitching", "coping with close game", "sense of responsibility", "pacing", "stability of pitched ball speed"

and "poker face". In this embodiment, the above fielder and pitcher parameters are set to all athlete characters. Further, the ability or tendency (positive direction/negative direction) of each of the athlete parameters is defined based on a desired number of grades or levels, for example, two grades (presence: "1" and absence: "0"), three grades (−1, 0 and 1) or four or more stages.

Figure 4:
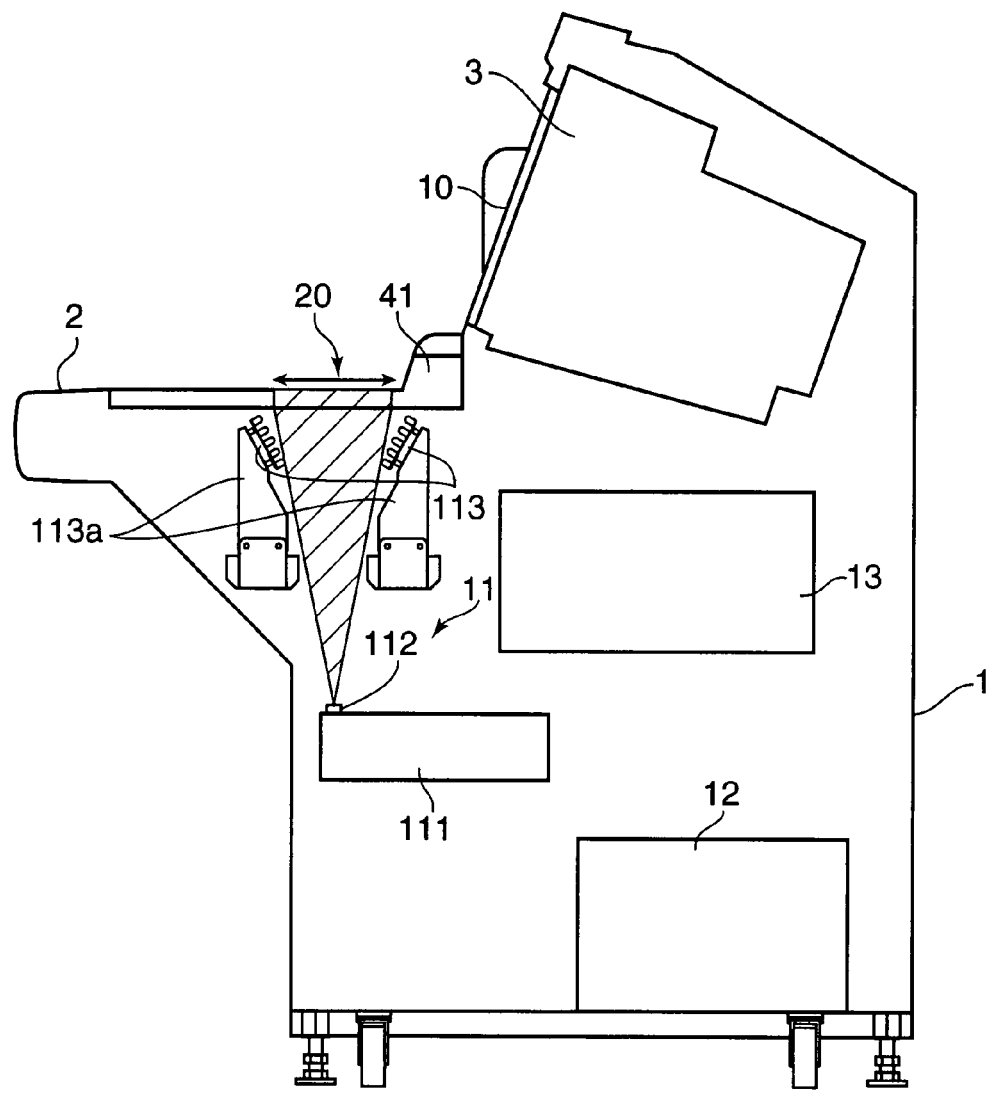
FIG. 4 is a side sectional view of the game apparatus.
Figure 5:
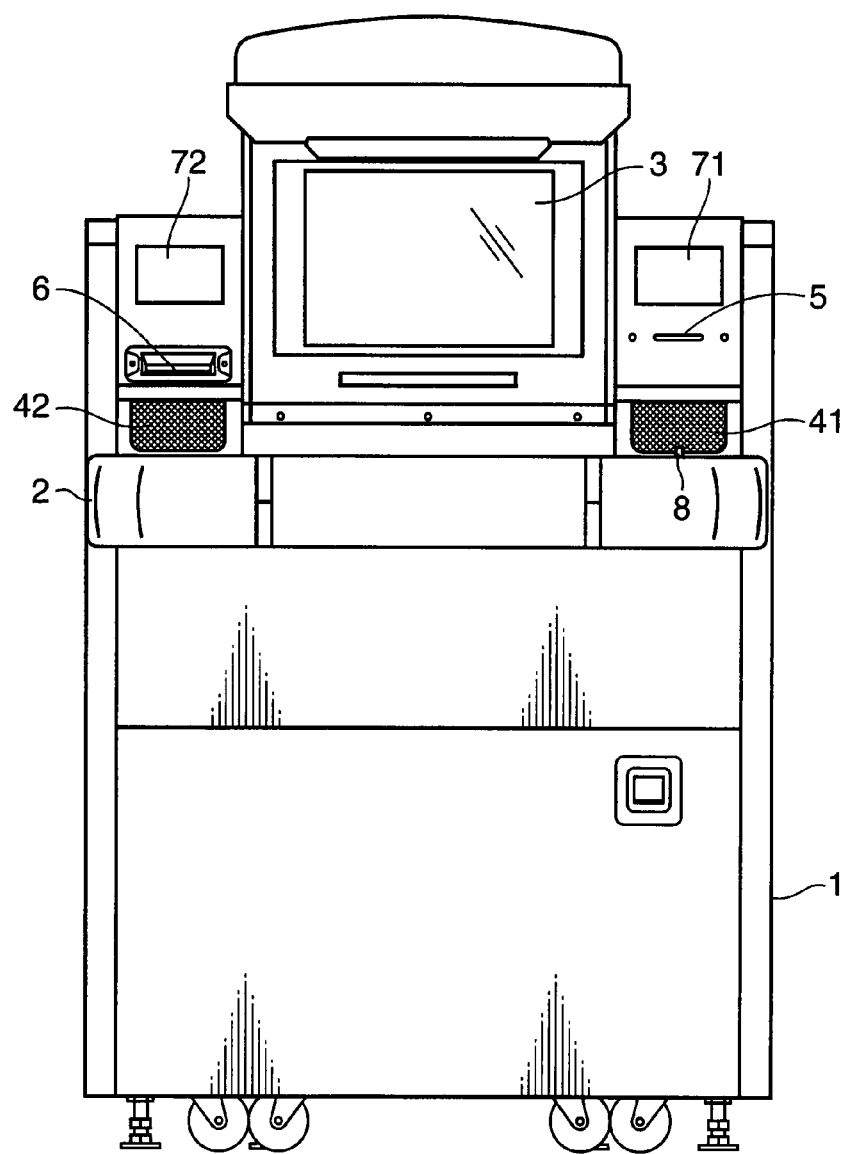
FIG. 5 is a front view of the game apparatus.

FIG. 4 is a side sectional view of the game apparatus, and FIG. 5 is a front view of the game apparatus. In FIG. 4, a touch panel 10 consisting of a transparent thin-layer-shaped pressure-sensitive element is disposed on a surface of a tube (i.e., screen) of the monitor 3 in a superimposed manner. This touch panel 10 is designed such that, when it is pressed by game player's finger or the like, the pressed position is output in the form of a voltage level indicative of horizontal and vertical positions. Specifically, the touch panel 10 is formed, for example, by arranging a transparent line-shaped pressure-sensitive material on a rectangular-shaped thin-layer member at a predetermined pitch and in lengthwise and crosswise directions, and then covering the obtained composite member by a transparent cover. The touch panel 10 is attached onto the surface of the tube of the monitor 3. As the touch panel 10, a conventional type may be employed and designed to detect a designated one of a plurality of buttons displayed on a screen of the monitor 3 to prompt selection or the like, based on an address and a pressed position of the designated button. The touch panel 10 is adapted, when an arbitrary position in an after-mentioned area graphic virtually representing a strike zone is pressed, to detect the pressed position. Specifically, coordinates of the pressed position detected from the touch panel 10 is converted to coordinates on a display screen, and the converted coordinates ate compared with coordinates of the displayed area graphic to identify the pressed position in the area graphic.

An image pickup section 11 is disposed inside the housing 1 and below the mounting surface 20. The image pickup section 11 serves as a means to detect a card-mounted position of the athlete card 9 mounted on each of the mounting surfaces 20 and read the information written on the bottom surface of the mounted athlete card 9. The image pickup section 11 comprises a casing which receives therein an image pickup processing section 111 adapted to control an image pickup operation and perform a processing of a picked-up image, an image sensor 112 serving as an image pickup means (a digital image-pickup device, such as a CCD camera) attached onto an upper portion of the casing, and a light source 113 adapted to generate infrared light. The image sensor 112 has a field angle which is set to provide a field of view covering all the mounting surfaces 20 so as to pick up images of the marks 91, 92 written on the bottom surface of each of the athlete cards 9 mounted on respective ones of the mounting surfaces 20. Although not seen in FIG. 4, in this embodiment, a predetermined plural number (e.g., two) of the image sensors 112 are disposed parallel to each other in the lateral direction (in FIG. 4, a depth direction of the drawing sheet), wherein one of the two image sensors 112 is set to have a field of view for covering the right-half five mounting surfaces 20, and the other image sensor 112 is set to have a field of view for covering the left-half five mounting surfaces 20.

The light source 113 is supported by a light-source support member 113*a*, and disposed below the card-mounting section 1 to extend obliquely downwardly relative to the longitudinal direction of the card-mounting section 1. The light source 113 is adapted to emit light of a predetermined wavelength range [in this embodiment, infrared light (including far-infrared light)] from the supported position toward the loading surfaces 20 in an obliquely upward direction, so as to irradiate the mounting surfaces 20 with the infrared light, i.e., irradiate the respective bottom surfaces of the athlete cards 9 mounted on the mounting surfaces 2 with the infrared light. With a view to uniformly irradiating all the mounting surfaces 20, a plurality of the light sources 113 are arranged over the lateral direction at desired intervals or approximately continuously. In order to achieve further uniform irradiation, the light sources 113 are disposed, respectively, on frontward and rearward sides of the mounting surfaces 20, and located out of the field angle of the image sensor 112 so as not to hinder the image pickup operation. The image sensor 112 comprises a large number of photoelectric conversion elements arranged, for example, in a matrix pattern. The image sensor 112 is adapted to periodically receive an optical image of infrared light which is emitted from the light source 113 and then reflected by the bottom surface of the athlete card 9 on each of the mounting surfaces 20 to represent the marks 91, 92, by each of the photoelectric conversion elements, and convert the received optical image to an electric signal having a level corresponding to an amount of the received infrared light. Although not illustrated, a filter is preferably disposed in front of the photoelectric conversion elements to transmit only infrared light therethrough. The image pickup processing section 111 is operable to, after performing a processing of transferring (loading) a periodically-picked-up image into an internal memory (not shown), extract the position detection mark 91 from the picked-up image developed in the memory, as a memory address, and identify a shape of the position detection mark 91 through the use of a pattern recognition technique or the like so as to calculate a card-mounted position of the athlete card 9 on the mounting surface 20. The image pickup processing section 111 is also operable to read the athlete identification data of the character mark 92, for example, in the form of bit information of the areas in the column and row directions, based on address information of a pixel which has detected the position detection mark 91 in the picked-up image.

The housing 1 is internally provided with a power supply section 12 adapted to supply a desired level of electric power to each section of the game apparatus, and a control board section 13 internally equipped with various control boards for generally executing a game processing.

Figure 6:
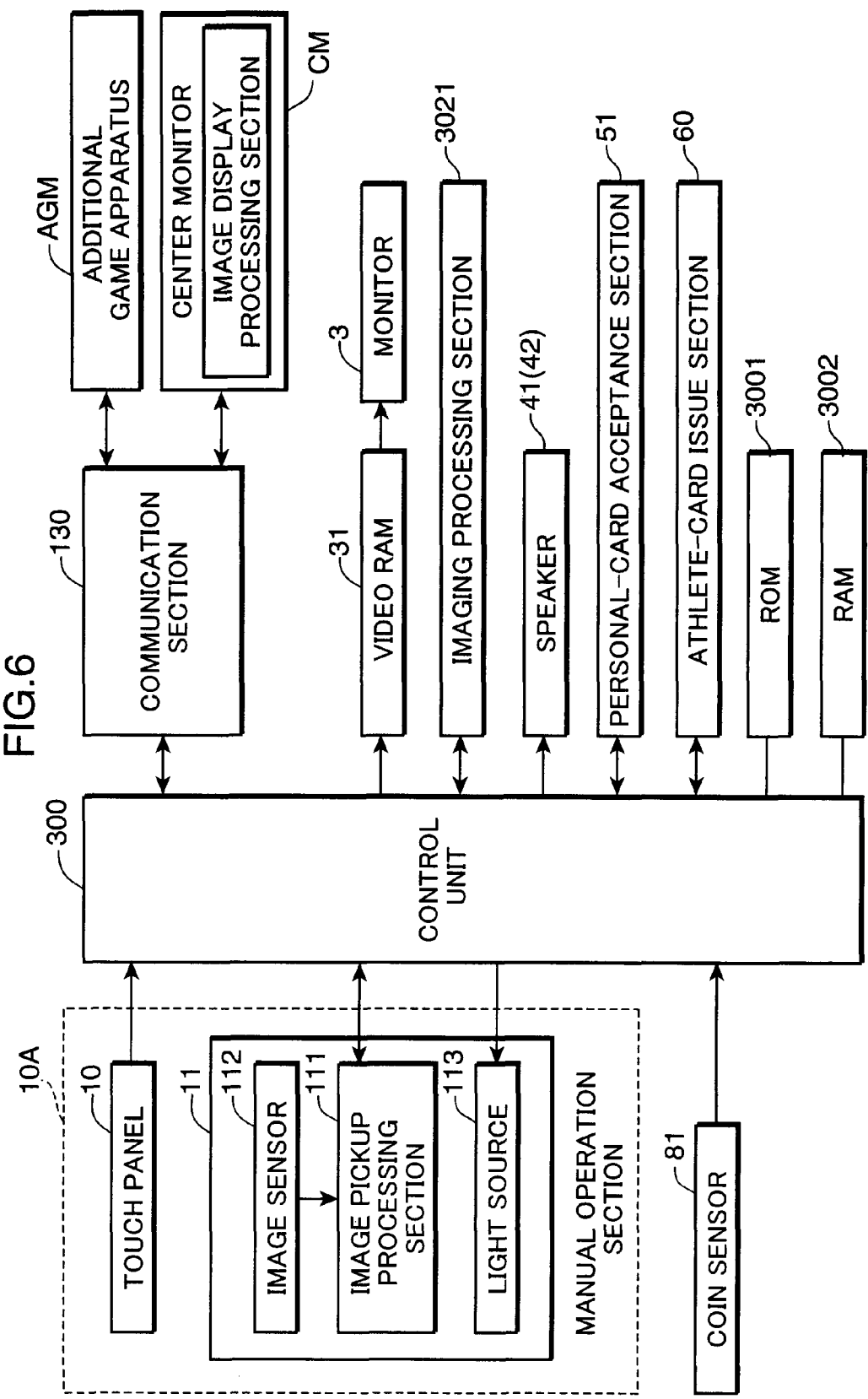
FIG. 6 is a block diagram showing a hardware comprising a control unit incorporated in a control board section, and various sections.

FIG. 6 is a block diagram showing a hardware comprising a control unit incorporated in the control board section, and various sections. In FIG. 6, an interface between the control unit 300 and each section, and a section adapted to generate a drive signal for driving each section, in response to receiving a control instruction, may be configured in a conventional manner, and will be omitted where appropriate.

A communication section 130 is adapted to receive and transmit data from/to another (i.e., opponent's) game apparatus AGM, and transmit data, such as game state information, to a center monitor CM, according to need. The game apparatus according to this embodiment is intended to be placed in a hall (game hall or game arcade) in a desired plural number. The center monitor CM is internally equipped with a computer including a center-monitor image display processing section, and adapted to receive an operational signal, such as a signal representing a use state or a game state during execution of the game, from each of the game apparatuses, and selectively display information about the use and/or game states in the hall, or display, in the hall, information about the game state, such as large score difference or even score, or a game image of a particular state, such as a pinch or chance in the 9-th inning, to promote motivation to the play.

In a system where the game apparatuses are placed in a plurality halls separately, the system will be configured to allow the game to be played between the different halls through the communication section 130. Further, the communication section 130 is communicatably connected to a center server (not shown) through a network, in such a manner that, when a personal card is inserted into the game apparatus, data necessary for a game processing, such as after-mentioned predetermined record data about previous games, in game record data of a player identified by information of the personal card is transferred to the game apparatus which is operated by this player (hereinafter referred to as "player's game apparatus") and at least one second game apparatus which is operated by an opponent who plays a competition game against the player (hereinafter referred to as "opponent's game apparatus"), according to need, and, upon termination of the game, a result of this game is acquired to update the record and manage the updated data.

The touch panel 10 and the image pickup section 11 make up a manual operation section 10A. A coin sensor 81 is disposed inside the coin input slot 8 provided as the game start condition, to check whether the input coin is true or false, and count a required number of input coins. The input coins will be stored in a cashbox (not shown) disposed inside the housing. A personal-card acceptance section 51 is disposed inside the personal-card loading slot 5, and adapted, when a personal card is inserted into the personal-card loading slot 5, to check whether a player of the personal card is a membership, through the center server, and, upon termination of the game, to return the personal card from the personal-card loading slot 5. In a system devoid of the center server, the game apparatus may store membership information to perform the above checking processing, or the personal card may be configured to fully store data, such as game record data.

An athlete-card issue section 60 is internally provided with a card container (not shown) where a large number of athlete cards 9 are contained in a stacked state, and adapted to carry a predetermined number (in this embodiment, one) of athlete cards 9 from the card container to the athlete-card issue slot 6 and offer (give away) the athlete card 9 to the player. This is intended to create a scheme where a player collects the athlete cards, and arouse the player to play the game. The number of athlete cards to be issued may be changed depending on a game result.

A ROM 3001 stores a game program for operating the game, entire image data to be displayed on the monitor 3, and an imaging processing program for creating a three-dimensional image in a game space. The ROM 3001 also stores various parameters necessary for determining a game progression and a game result, and various data to be used as factors for judgment, in the form of a table. Particularly, in connection with the assumption that the game apparatus according to this embodiment is designed to simulate a baseball game, a control program for executing a defensive-side processing and an offensive-side processing in conformity to actual baseball rules is created and stored in the ROM 3001, and the fielder parameters and pitcher parameters for each of all athletes who will appear in the game as the characters are stored in the ROM 3001, in associated relation with the athlete identification data.

A RAM 3002 includes a work area for temporarily storing data during a course of a processing, and serves as a means to store various data read from the ROM 3001, and various parameters, such as abilities of each of the athlete cards 9 picked up by the image pickup section 11, during the game, and allow the stored data and parameters to be read therefrom and reflected on the game, according to need.

A video RAM 31 is designed to have a memory capacity corresponding to at least that of display pixels of the monitor 3, and used for forming a display image. An imaging processing section 3021 is a hardware circuit section operable, in response to receiving an imaging command from the control unit 300, to develop a display image to the video RAM 31.

Figure 7:
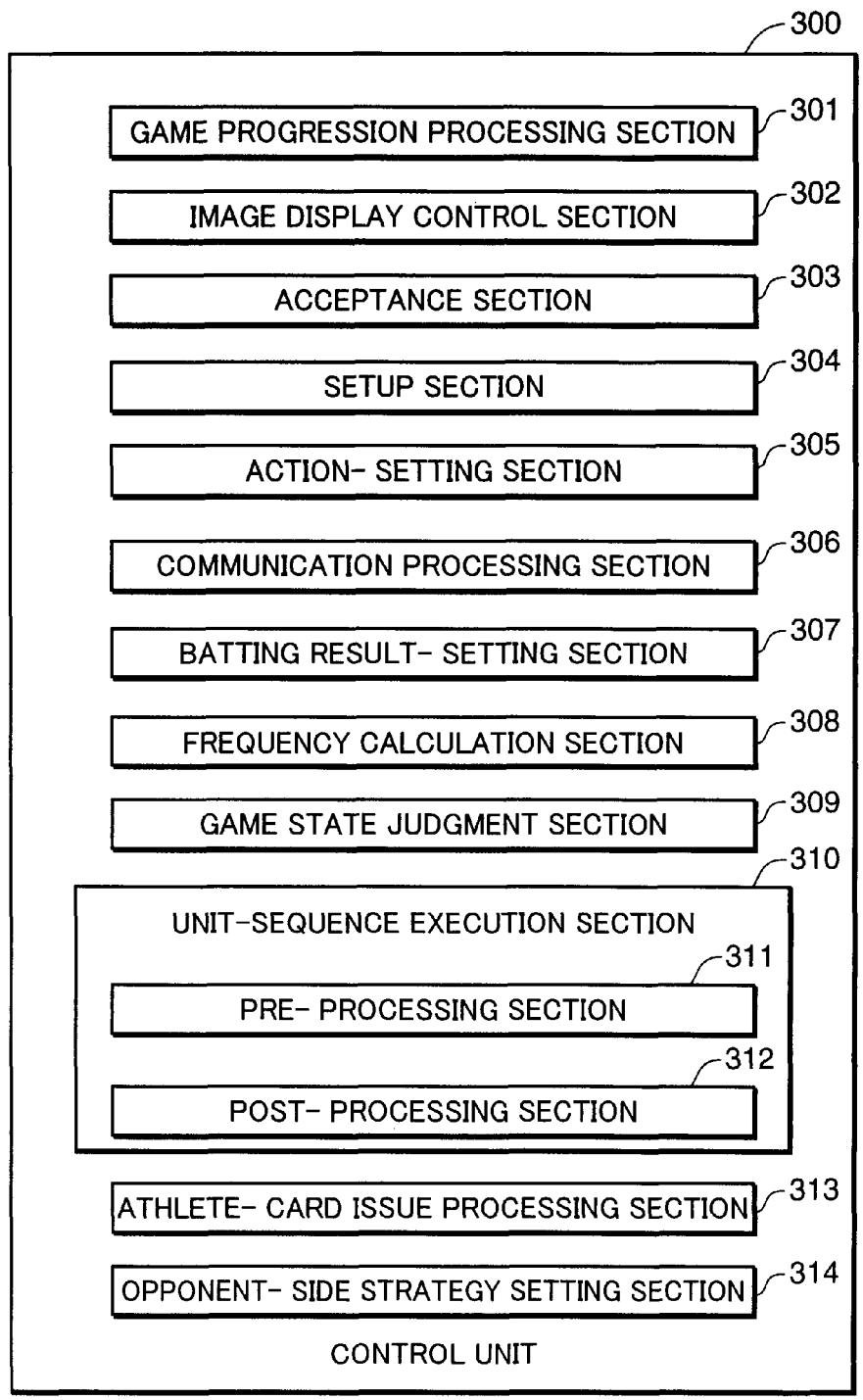
FIG. 7 is a block diagram for explaining a function of the control unit.

FIG. 7 is a block diagram for explaining a function of the control unit. The control unit 300 comprises: a game-progression processing section 301 operable, based on the game program and an input operation to the manual operation section 10A, to generally control a progression of the game; an image display control section 302 operable to controllably display a game image onto the monitor 3; an acceptance section 303 operable to accept input operation information from the manual operation section 10A; a setup section 304 operable, based on a pitch location or a swing location designated when an after-mentioned "location designation" button displayed on the monitor 3 is selected, to set up a position and shape of a mark image; an action-setting section 305 operable, based on a content accepted by the acceptance section 303, to create pitching data for pitching of a pitcher character or batting data for swing of a batter character; a communication processing section 306 operable to allow an exchange about the pitching data or the batting data with the opponent's game apparatus AGM and a communication about data necessary for the center monitor CM to be performed through the communication section 130, and, according to need, allow data exchange with the center server to be performed; a batting result-setting section 307 operable, based on data received from the action-setting section 305 and the opponent's game apparatus AGM, to determine a batting result; a frequency calculation section 308 operable, based on a previous game record of an opponent, to calculate data about a tendency of a pitch or swing location to be designated; a game state judgment section 309 operable to judge a game state having an impact on a competition result; a unit-sequence execution section 310 operable to controllably execute a series of sequences individually, based on a content of the batting result determined by the batting result-setting section 307, a content of the input operation from the manual operation section 10A, and the pitcher parameters when the player's character is a pitcher or the fielder parameters when the player's character is a fielder, or when there is no input operation; an athlete-card issue processing section 313 operable to issue an athlete card 9; and an opponent-side strategy setting section 314 operable to substitutionally execute an opponent-side processing for the purpose of a so-called CPU match (i.e., player vs. CPU competition) where a player plays the game against an internal computer of the game apparatus.

The image display control section 302 is adapted to display various image, such as a baseball field, athlete characters on defensive and offensive sides (at least a pitcher character and a batter character), a ball character, a bat character, an after-mentioned area graphic virtually representing a strike zone, and after-mentioned first and second mark images to be created as a result of after-mentioned location designation, on the monitor 3 in conjunction with the game progression. The image display control section 302 includes the video RAM 31. In the present invention, the image display control section 302 serves as at least character-image display control means, area-graphic display control means and mark display control means.

In this embodiment, the baseball game is configured on the assumption that an action for one at-bat (this action will hereinafter be referred to as "single sequence"), where a player's character (i.e., a pitcher character when the sequence is a defensive-side sequence, or a batter character when the sequence is an offensive-side sequence) given with an actionrelated instruction from a player (i.e., a game player who operates the game apparatus), duels with an opponent's character (i.e., a batter or pitcher character which competes against the player's character) given with an instruction from an opponent (i.e., an opponent who operates the opponent's game apparatus or an internal CPU of the player's game apparatus), in a pitcher vs. batter relation, is executed total 27 times (serially or sequentially), i.e., 3 outs/inning×9 innings, in conformity to the baseball rules, and the player and the opponent compete on a final score, i.e., a game result (i.e., competition result). More specifically, in this embodiment, the baseball game is configured to be progressed every execution of a duel consisting of one pitch to one batter.

With a view to three-dimensional imaging, each of the pitcher character, the batter character, and optionally other athlete characters and a background image simulating a baseball field, is formed of a desired number of polygons. The imaging processing section 3021 (see FIG. 6) is operable, based on an imaging instruction from the image display control section 302, to perform a calculation for conversion from a position on a three-dimensional space to a position on a pseudo three-dimensional space, a light-source calculation processing and others, and then perform a processing of writing data about a target image in the video RAM 31, e.g., a processing of writing (pasting) texture data to an area of the video RAM 31 designated by the paragons.

A relationship between respective operations of the image display control section 302 and the imaging processing section 3021 will be described below. Based on an operating system recorded on the ROM 3001, the image display control section 302 reads image data, control program data and game program data from the ROM 3001. A part or entirety of the read image data, control program data and game program data are stored in the RAM 3002. Subsequently, the image display control section 302 performs an image display processing, based on an image processing subroutine in the control program stored in the RAM 3002, various data (polygons and texture of a display object, other image data including text image, and audio data), a detection signal from a detection section and others. Specifically, according to the game progression, the image display control section 302 appropriately creates a command for a task of imaging or audio output. Based on the command, the image processing section 3021 performs a calculation of a viewpoint position, a calculation of a character position on the three-dimensional space (or on a two-dimensional space, as is obvious) with respect to the calculated viewpoint position, a light source calculation, an audio-data creation/modulation processing, and others. Then, based on the above calculation results, the image processing section 3021 performs a processing of writing data about a target image in the video RAM 31. The image data written in the video RAM 31 is sent to the monitor 3 (after being sent to a D/A converter through an interface and converted to an analog image signal), and displayed as an image on the surface of the tube. In the same manner, the audio data and sound effect data are output from the ROM 3001 through the RAM 3002, and output as audio from the speakers 41, 42 (through an amplifier after being sent to a D/A converter through an interface and converted to an analog audio signal).

The imaging command includes an imaging command for imaging a three-dimensional image using the polygons, and another imaging command for imaging a usual two-dimensional image. Each of the polygons is a two-dimensional image having a polygonal shape (in this embodiment, a triangular shape or a quadrangular shape). The imaging command for imaging a three-dimensional image using the polygons comprises polygon-apex address data read from the ROM 3001, data about a texture address indicative of a storage position of texture data to be pasted onto the polygon, data about a color-pallet address indicative of a storage position of color pallet data representing a color of the texture data, and luminance data indicative of a luminance of the texture. One character (or object) is made up of a large number of the polygons. The image display control section 302 is operable to store, on the RAM 3002, coordinate data of each of the polygons on three-dimensional space. Then, in an operation of moving the characters and others on the screen of the monitor 3, the following processing is performed.

Based on three-dimensional data about the apexes of the respective polygons which is temporarily stored in the RAM 3002, translation-distance data of the respective polygons and rotation-angle data of the respective polygons, the image display control section 302 sequentially calculates three-dimensional coordinate data of the respective polygons after translation and rotation. Among the calculated three-dimensional coordinate data of the respective polygons, horizontal and vertical coordinate data are sent as address data on a display area of the RAM 3002, i.e., polygon-apex address data, to the imaging processing section 3021. The imaging processing section 3021 writes texture data designated by pre-assigned texture address data, on a triangular-shaped or quadrangular-shaped display area designated by address data of three or four polygon apexes. In this manner, a character (or object) formed of a number of polygons with texture data pasted thereon is displayed on the display surface of the monitor 3.

The acceptance section 303 is adapted to accept information about pressing by a player, from the manual operation section 10A (specifically, from the touch panel 10), and accept information about a card-mounted position of an athlete card based on a player's operation, and information about the pitcher parameters or fielder parameters representing abilities of an athlete character in the ROM 3001 which corresponds to athlete identification data on a bottom surface of the athlete card 9, from the image pickup section 11.

Figure 15:
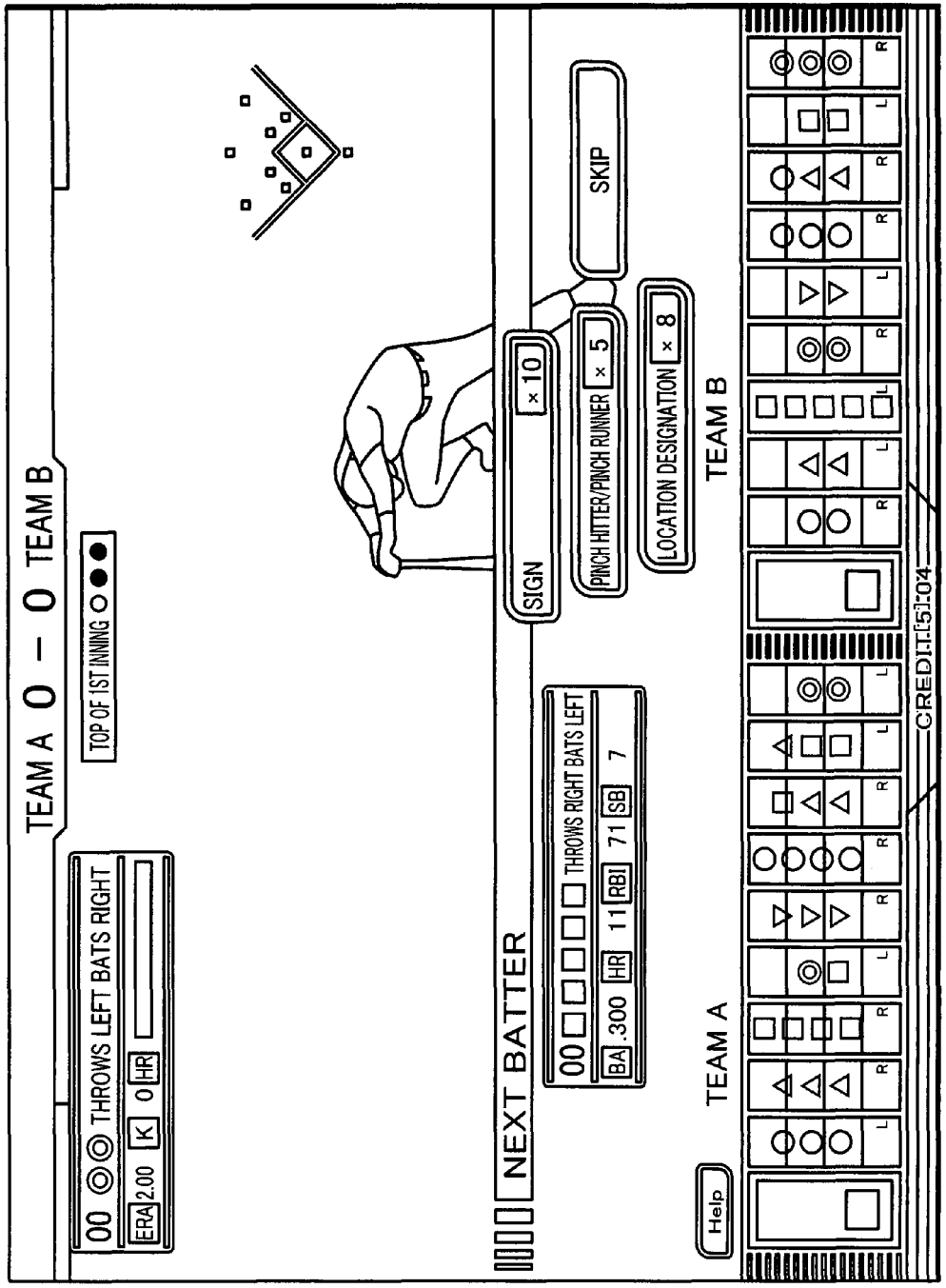
FIG. 15 illustrates a game image at start of a sequence in case where a player plays the game on a batter side.

A plurality of items for use in a competition are stored in the ROM 3001 in a selectable manner. In this embodiment, the items include "sign (directive)", "pinch hitter/pinch runner", "location designation", and "skip" to be used when none of the above items is selected. The image display control section 302 is operable, in response to start of each sequence, to display each of the items in the form of a button, as shown in FIG. 15.

The item "sign" includes the following five sub-items prepared for a defensive side (i.e., fielding team (fielding side)): "lookout for stolen base", "lookout for hit and run", "defense for bunt", "defense for double play" and "defense for extra-base hit", and the following seven items prepared for an offensive side (i.e., team at bat (batting side)): "bunt", "sacrifice bunt", "hit and run", "stolen base (double steal)", "stolen second base", "stolen third base" and "squeeze play". When the item "sign" is selected, contents of the above sub-items will be selectably displayed on the screen in the form of a button. It is understood that any other suitable defensive item may be employed in place of or in addition to the above items. The item "pinch hitter/pinch runner" is executed by mounting a new athlete card 9 of an intended pinch hitter or pinch runner on the mounting surface 20 where an athlete card 9 to be changed has been mounted. When the athlete card 9 is replaced, athlete parameters corresponding to athlete identification data newly read by the image pickup section 11 will be read from the ROM 3001, and used for the game.

The item "location designation" enables a player to manually designate a pitch location when the player plays the game on a pitcher side, or to manually designate a swing location when the player plays the game on a batter side.

An area graphic having a predetermined shape, typically a quadrangular shape, which virtually represents a given zone, such as a strike zone, above a home base (the area graphic will hereinafter be referred to "strike zone image SZ" for descriptive purposes) is displayed in the game space, preferably, as a semi-transparent image obtained through a processing by the image display control section 302. Thus, the pitch or swing location can be manually designed by pressing an intended position in the strike zone image SZ through the touch panel 10 superimposed on the monitor 3.

In response to pressing of the "location designation" button in FIG. 15, the image display control section 302 is operable to display the strike zone image SZ (see FIG. 16) so as to allow the player to designate a pitch location when the player's character is on the defensive side, or display the strike zone image SZ (see FIG. 17) so as to allow the player to designate a swing location when the player's character is on an offensive side. Further, every time the location is designated, image screens illustrated in FIG. 16 or 17 and FIG. 18, 19 or 20 will be displayed to allow the player to check the designated location.

Figure 16:
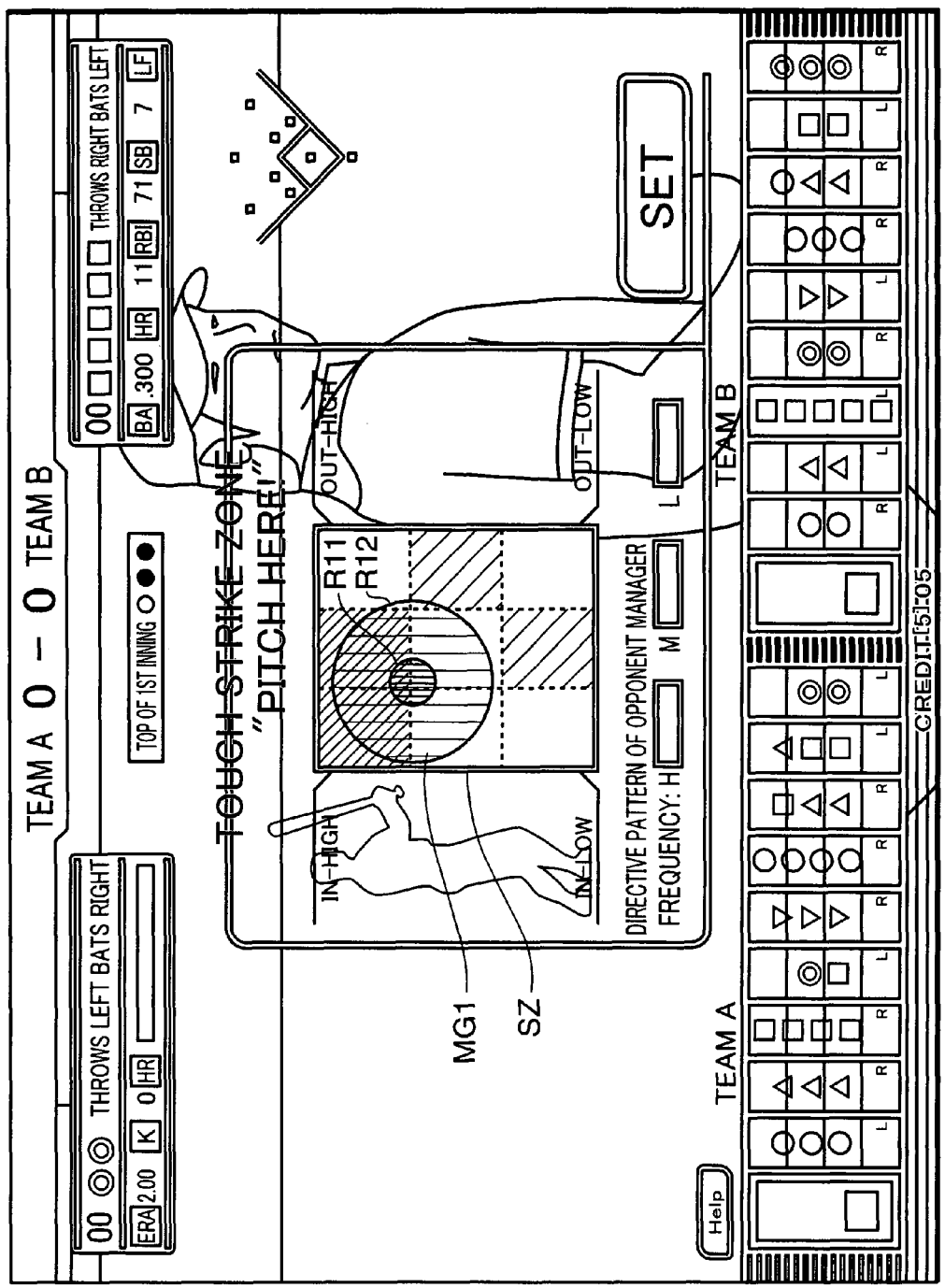
FIG. 16 illustrates a game image for guiding designation of a pitch location in case where the player plays the game on a pitcher side.
Figure 17:
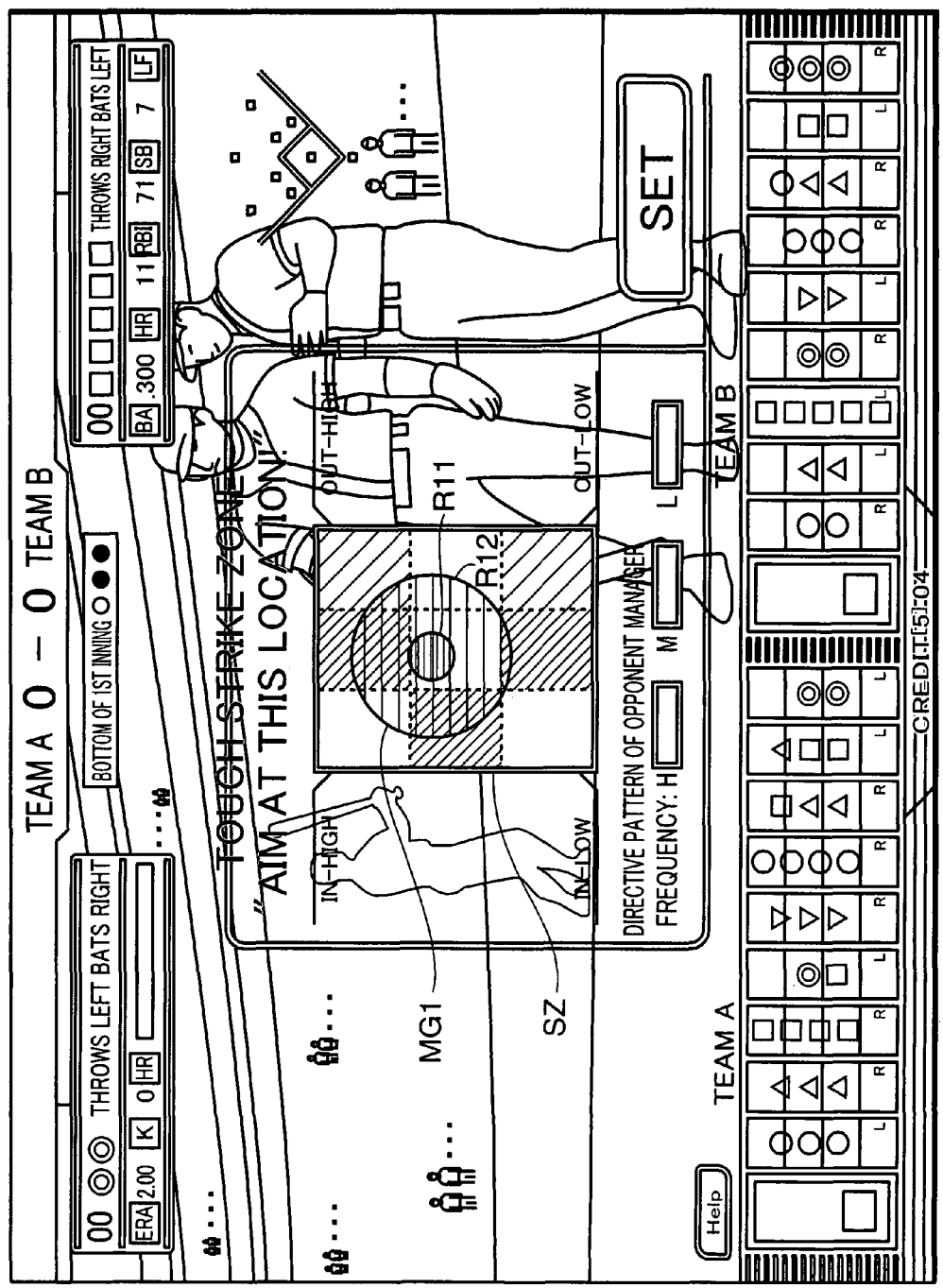
FIG. 17 illustrates a game image for guiding designation of a swing location in case where the player plays the game on the batter side.

When the "location designation" button in FIG. 15 is pressed, the setup section 304 is activated to set up the position pressed by the player through the touch panel 10 on the monitor 3, to the strike zone image SZ illustrated in FIG. 16 or 17. Specifically, the position to be designated when the player plays the game on the defensive side is a position where the ball character configured to simulate a ball to be thrown by the pitcher character passes through the strike zone image SZ, i.e., a pitch location, and the position to be designated when the player plays the game on the offensive side is a position where the bat character configured to simulate a bat to be swung by the batter character passes through the strike zone image SZ, i.e., a swing location.

Figure 18:
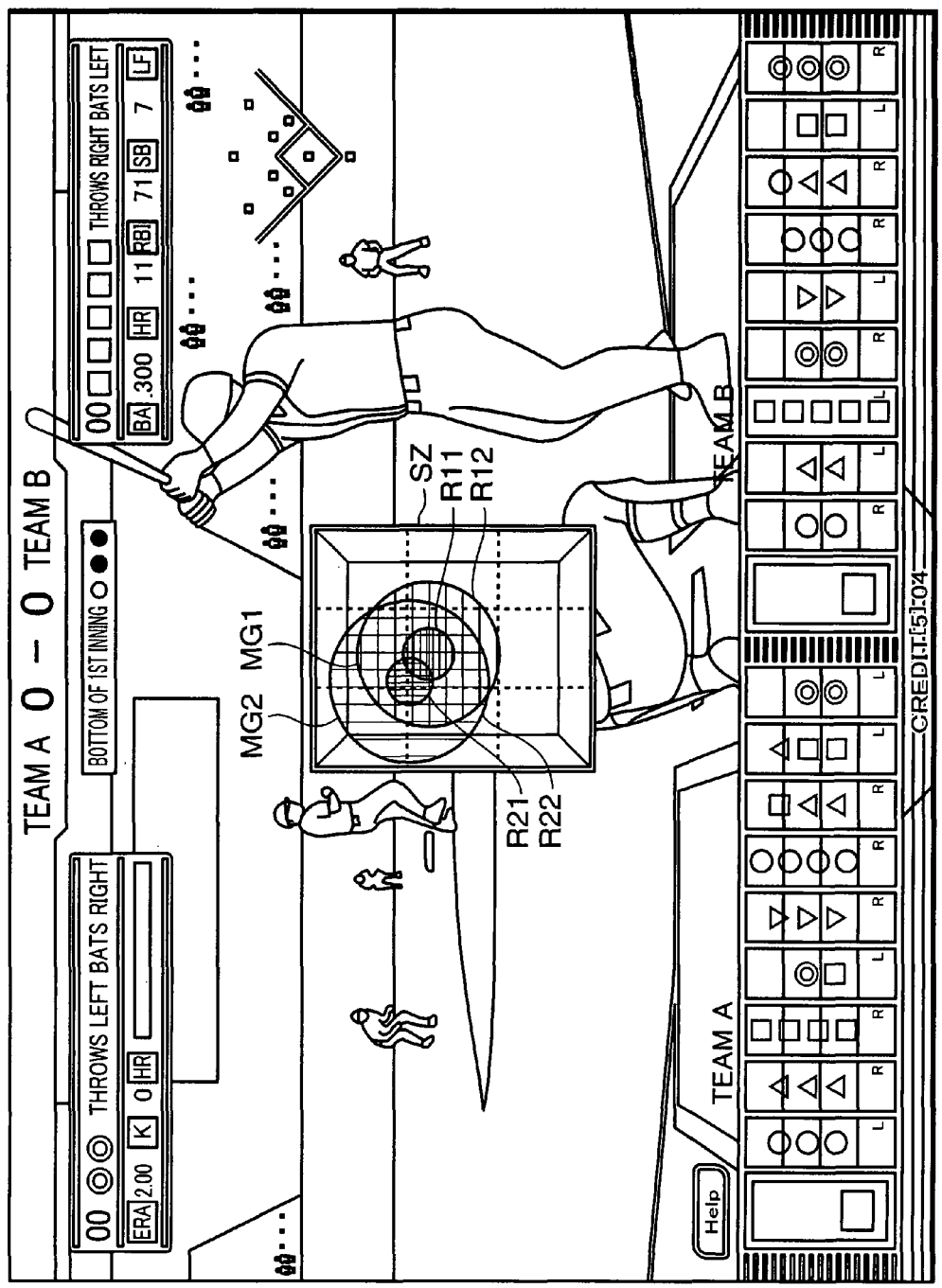
FIG. 18 illustrates a game image showing a state when the pitch location and the swing location overlap each other in case where the player plays the game on the batter side.
Figure 19:
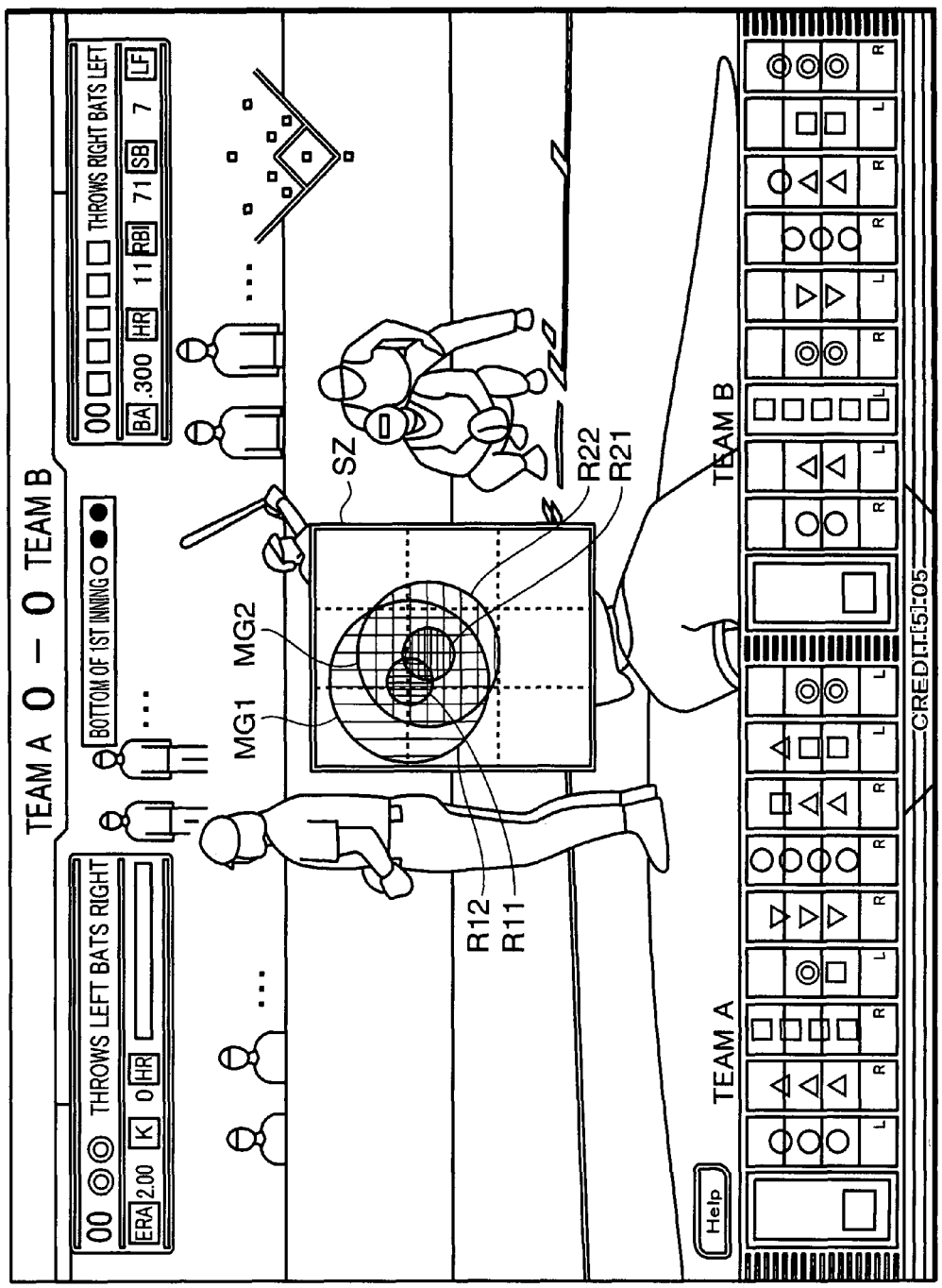
FIG. 19 illustrates a game image showing a state when the pitch location and the swing location overlap each other in case where the player plays the game on the pitcher side.
Figure 20:
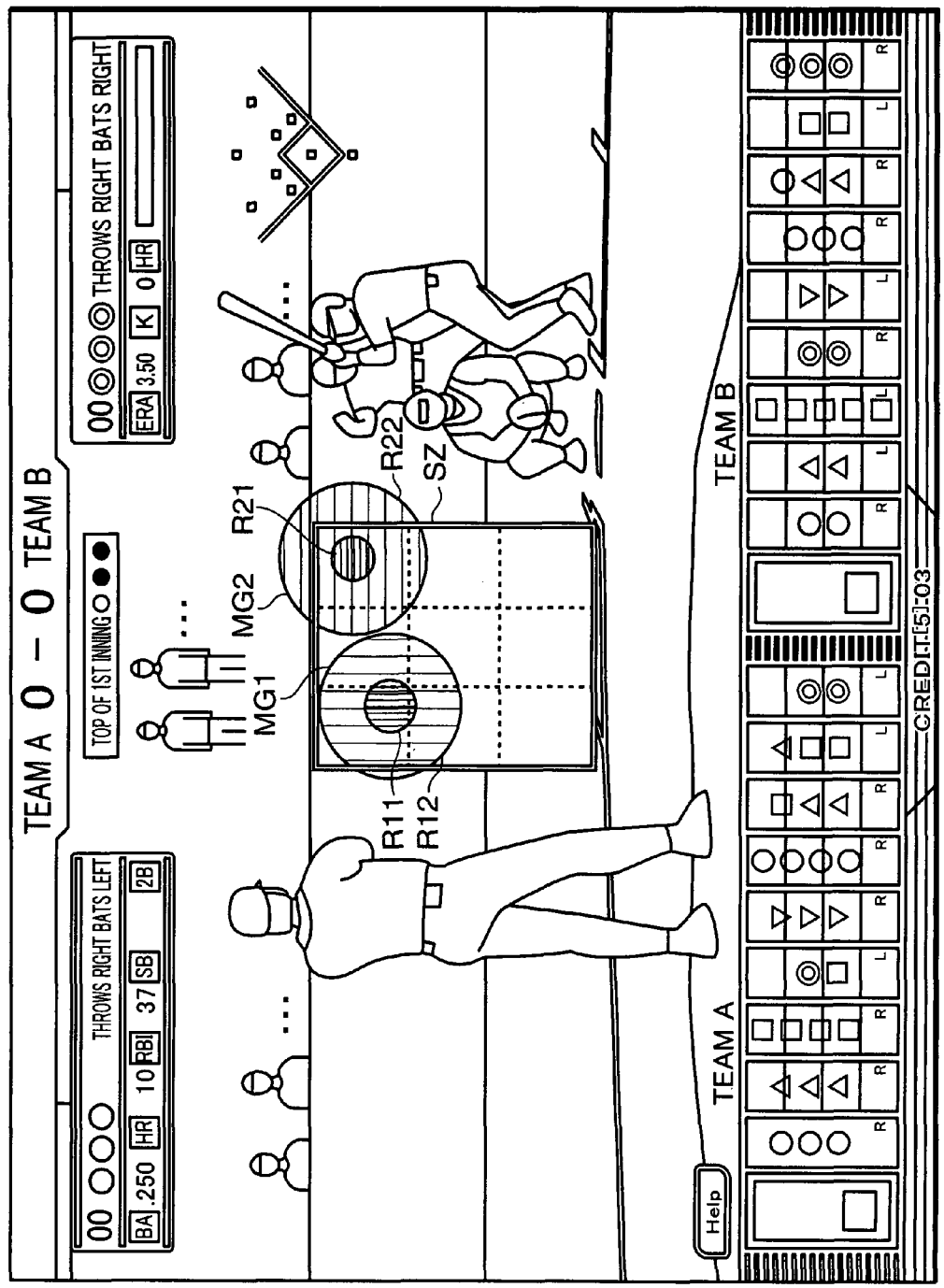
FIG. 20 illustrates a game image showing a state when the pitch location and the swing location have no overlapping in case where the player plays the game on the batter side.

Then, the setup section 304 is operable to create a predetermined shaped graphic on the basis of the location designated by the player (in this embodiment, a circular graphic which has a center located at the designated location and a predetermined radius). The image display control section 302 is then operable to display the created graphic on the monitor 3 as a mark image MG1 (first mark image). Concurrently, in the opponent's game apparatus operated by an opponent who plays against the player, the location designation operation is performed relative to the strike zone image SZ in the same manner, and the player's game apparatus receives data about opponent's designated location through the communication section 130, as will be described in detail later. Thus, as to the opponent's designated location, the setup section 304 is operable to create a circular graphic having a predetermined radius in the same manner, and the image display control section 302 is operable to display the created graphic as a mark image MG2 (second mark image) together with the mark image MG1, as shown in FIGS. 18 to 20. In this operation, the image display control section 302 is configured to perform the simultaneous display of the mark images MG1, MG2 after completion (setup) of the location designation processing for the mark image MG1, so as to validate game's attractions coming from predicting the location to be designated by the opponent (reading or sherlocking opponent's tactics).

The circular graphic of the mark image MG1, MG2 employed in this embodiment is a double circle, although it may be a single circle. Specifically, the double circle consists of an inner central circle region R11 and an outer ring region R12, which are displayed in different display modes to facilitate discrimination therebetween, typically in different colors.

The setup section 304 is configured to set up a diameter of the central circle region R11 and a width of the ring region R12 of the mark image MG1, based on the following parameter. As to a pitcher, the parameter for the central circle region R11 includes a factor about a level of pitched-ball power, such as "pitched-ball speed", "intimidating power", "correction against left-handed batter" and "acceleration of pitched ball", and the parameter for the ring region R12 includes a factor about a level of pitched-ball control, such as "ball control"; "rate of four wide ones", "rate of mistake pitches", "quick pitching". As to a batter, the parameter for the central circle region R11 includes a factor about a level of batted-ball power, such as "hitting power", "trajectory of batted ball", "intimidating power", "power hitter", "winning hitter", "coping with adversity", "multi-hit", "tackle" and "cleanup batter", and the parameter for the ring region R12 includes a factor about a level of hittability, such as "bat control", "bat control correction against left-handed pitcher", "correction in chance", "hitting to opposite field", "spray-hitting style", "infield single", "bunt skill", "grand-slam hitter", "first-pitch swinger", "hitting streak" and "tenacious player". It is understood that any other suitable factor (parameter) may be employed in place of or in addition to the above parameters.

Thus, as to the pitcher character, the radius of the central circle region R11 (R21) becomes smaller as a total parameter value of the factors about pitched-ball power is increased, and the radius (width) of the ring region R12 (R22) becomes smaller as a total parameter value of the factors about pitched-ball control is increased. As to the batter character, the radius of the central circle region R11 (R21) becomes larger as a total parameter value of the factors about batted-ball power is increased, and the radius (width) of the ring region R12 (R22) becomes larger as a total parameter value of the factors about hittability is increased. That is, as the pitcher character has higher ability, the mark image for the pitcher side becomes smaller so as to avoid overlapping with the swing location of the batter side (become favorable to the pitcher side). On the other hand, as the batter character has higher ability, the mark image for the batter side becomes larger so as to overlap the pitch location of the pitcher side (become favorable to the batter side).

A part of the above parameters are used without relation to a game state, and the remaining parameters are used in connection with the game state (sequence). In the latter case, one or more of the parameters corresponding to the game state will be used. For example, in a game state (sequence) where an opponent's batter is a left-hand batter when the player plays the game on the defensive side, a "left-hand batter" parameter is applied to the pitcher. In this case, if the "left-hand batter" parameter is "1", the central circle region R11 of the mark image MG1 will be set to have a relatively small radius. In a game state (sequence) where the bases are loaded when the player plays the game on the offensive side, a "bases loaded" parameter is applied to the batter. In this case, if the "bases loaded" parameter is "1", the ring region R12 of the mark image MG1 will be set to have a relatively large width. Conversely, if the "bases loaded" parameter is "0", the ring region R12 of the mark image MG1 will not be changed by this parameter.

In order to set up the diameter of the central circle region R21 and the width of the ring region R22 of the mark image MG2, athlete identification data of an athlete card is received through the communication section 130 upon start of the game or when one or more of the opponent's characters are changed, and athlete parameters corresponding to the received athlete identification data are read from the ROM 3001 and used for the setup processing. Levels of the respective radii of the central circle regions R11, R21 and levels of the respective widths of the ring regions R12, R22 will have impact on a degree of overlapping between the mark images MG1, MG2. Specifically, there are the following cases: the mark images MG1, MG2 have no overlapping; only the ring regions R12, R22 overlap each other; the central circle region R11 (or R21) of either one of the mark images MG1, MG2 overlaps the ring regions R12 (or R22); and the central circle regions R11, R21 overlap each other. The overlapping degree reflects on a batting result. This point will be described in detail later with reference to FIGS. 8 to 10.

The action-setting section 305 is provided as a means to create information necessary for determining a batting result, i.e., data to be transmitted to the opponent's game apparatus, based on a part of input operation information from the manual operation section 10A, and the athlete parameters, according to the selection items illustrated in FIG. 15. In information to be input from the manual operation section 10A, information about the card-mounted position from the image pickup section 11 reflects on a processing of allowing an attribute defining a mode of an action of an athletic character in a plurality of levels to be set at one of the levels so as to virtually determine in what mode the character's action is taken.

The level of the attribute represents a level (pitching power) of a pitcher when he throws a ball at full power or while saving its power, or a level (swing power) of a batter when he swings a bat. Specifically, as to the attribute level for a pitcher, when an athlete card 9 is mounted on a front side relative to the central position of the mounting surface, the pitching power will be set closer to the full power to increase a pitched-ball speed and lower a hits-allowed rate while increasing a stamina consumption. When the athlete card 9 is mounted on a rear side relative to the central position of the mounting surface, the pitching power will be saved (the pitched-ball speed is lowered) to increase the hits-allowed rate while reducing the stamina consumption. The parameter of stamina consumption is pre-managed, and configured to be increased in a virtual situation when the pitcher is on the batting side and in a dugout or bench. Further, the parameter of stamina consumption for the pitcher is configured to be reduced depending on the level of pitching power by a predetermined value.

As to the attribute level for a batter, when an athlete card 9 is mounted on a front side relative to the central position of the mounting surface, the swing power will be increased to more hardly swing a bat, and lower a hitting rate. When the athlete card 9 is mounted on a rear side relative to the central position of the mounting surface, the swing power will be more saved to suppress a hard swing and increase a value of the hitting rate. The increase/decrease in swing power of a batter is reflected on respective level of distance and speed of a batted ball, i.e., a height in trajectory (i.e., a value of ascending vertical angle) of the batted ball, and a hit rate.

When the "sign (directive)" button in FIG. 15 is selected and then either one of the sub-items is selected when the player plays the game on the offensive side, the acceptance section 303 accepts the selection's content, and the action-setting section 305 receives the selection's content and sets the received selection's content as a result of the directive selection. According to an after-mentioned unit-sequence execution section 310, this directive selection result will reflect on a processing of changing the position of a fielder and a processing of a defensive position of a fielder and a processing of controlling base-running of a base runner, in such a manner as to simulate an actual baseball (i.e., according to a control program based on the baseball rules).

In this embodiment, the action-setting section 305 is adapted to create the following transmitting data: "ball release timing", "pitch type", "selected directive item", "pitch location" and "attribute level (full power to saved power)" for pitching data; and "swing timing", "selected directive item", "swing location" and "attribute level (hard swing to controlled swing) for batting data. In the pitching data, the "ball release timing", i.e., a time lag relative to the "ball release" (optimum ball release timing) in the pitcher parameters, is set based on a random processing using a random number generation section or the like. The "pitch type" is set from various breaking balls in the pitcher parameters, in consideration of the directive information and the attribute level. If the "location designation" button in FIG. 15 is not selected, the "pitch location" and "swing location" will be set by the CPU based on both the pitcher and batter parameters. In the batter data, the "swing timing", i.e., a time lag relative to the "swing timing" (optimum swing timing) in the fielder parameters, is set based on a random processing using a random number generation section or the like.

The communication processing section 306 is provided as a means to transmit given information set by the setup section 304 and the action-setting section 305 based on the contends of selection and designation from the manual operation section 10A, to the opponent's game apparatus, in a bidirectional manner. Thus, the player's and opponent's game apparatuses can receive data from the other side to have the same information therebetween.

The batting result-setting section 307 is provided as a means to determine a batting result. The batting result-setting section 307 is adapted to set the batting result in different processings depending on whether or not the "location designation" button is selected. Specifically, the batting result-setting section 307 is operable, when the "location designation" button is selected, to perform a processing, for example, of calculating a probability of making a hit by the pitcher character (hit rate), based on the pitcher and batter parameters and the exchanged data between the player's and opponent's game apparatuses, and using a predetermined calculation formula, then determining whether the batting result is whiff (struck out swinging) or hit, depending on a level of the probability (determined by an after-mentioned hitting determination processing), and, if hit, determining a trajectory (strength or distance) of a batted ball. In the above calculation formula, the stamina consumption is also used as a coefficient.

When the "location designation" button is selected, the batting result-setting section 307 is operable to perform a hitting determination processing corresponding to the "location determination". The hitting determination processing is intended to determine a hitting level, and a contact rate (%), depending on a degree of overlapping between the mark images MG1, MG2.

Figure 8A:
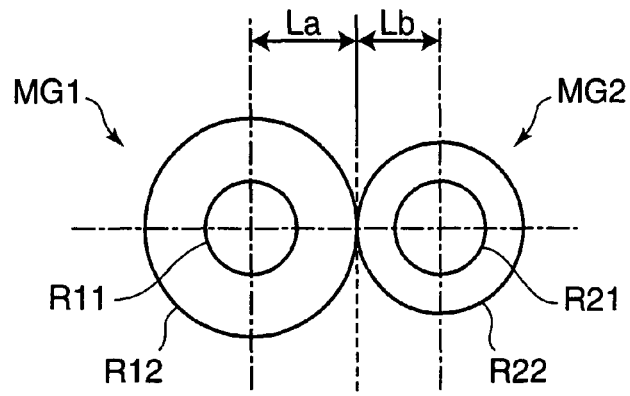
FIG. 8A shows a state when two mark images are in contact with each other.
Figure 8B:
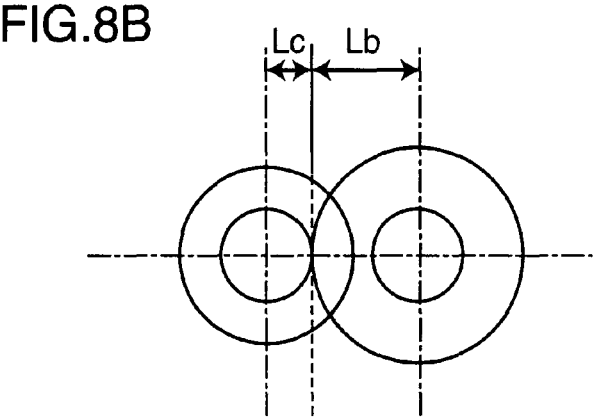
FIG. 8B shows a state where an outer peripheral edge of an outer ring region of one of the two mark images is in contact with an outer peripheral edge of an inner central circle region of the other mark image.
Figure 8C:
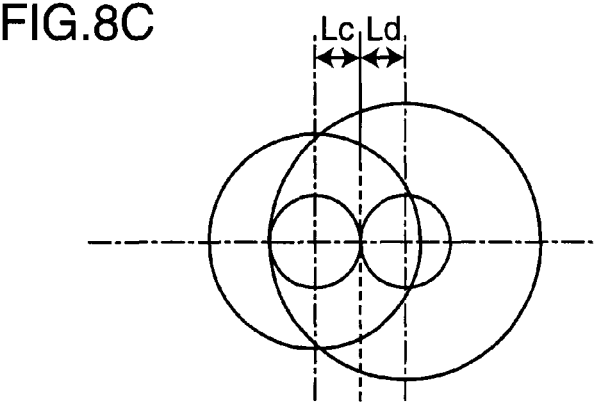
FIG. 8C shows a state where respective inner central circle regions of the two mark images are in contact with each other.

FIG. 8 is an explanatory diagram showing a degree of overlapping with the central circle region R11 and the outer ring region R12 of the mark image, and FIG. 9 is a flowchart showing a processing of determining a hitting level for the overlapping degree. FIG. 8A shows a state when the respective ring regions R12, R22 of the mark images MG1, MG2 are in contact with each other. FIG. 8B shows a state when an outer peripheral edge of the ring region R22 of the mark image MG2 is in contact with an outer peripheral edge of the central circle region R11 of the mark image MG1, and FIG. 8C shows a state when the respective central circle regions R11, R21 of the mark images MG1, MG2 are in contact with each other. In FIG. 8, a radius between the center of the mark image MG1 (mark image MG2) and the outer peripheral edge of the ring region R12 (ring region R22) is defined as La (Lb). Further, the central circle region of one of the mark images (in FIG. 8, the central circle region R11 of the mark image MG1) is defined as Lc, and the central circle region of the other mark image (in FIG. 8, the central circle region R21 of the mark image MG2) is defined as Ld.

In FIG. 9, it is first determined whether a center distance between the mark images MG1, MG2 is greater than (La+Lb) (Step S1). If the center distance is greater than (La+Lb), there is no overlapping, and therefore "whiff" will be set as the batting result (Step S3). When the center distance is equal to or less than (La+Lb), it is determined whether the center distance is greater than (Lb+Lc). If the center distance is greater than (Lb+Lc), the mark images MG1, MG2 are in between the states illustrated in FIGS. 8A and 8B, and therefore a level-1 (first level) hitting processing will be set as the batting result. When the center distance is equal to or less than (Lb+Lc), it is determined whether the center distance is greater than (Lc+Ld). If the center distance is greater than (Lc+Ld), the mark images MG1, MG2 are in between the states illustrated in FIGS. 8B and 8C, and therefore a level-2 (second level) hitting processing which is more favorable to a batter as compared with the level-1, for example, a processing of providing a higher batted-ball speed, will be set as the batting result. When the center distance is equal to or less than (Lc+Ld), it is determined whether the center distance is greater that a predetermined value approximately equal to zero. If the center distance is greater that the predetermined value, the overlapping degree is greater than at least that in FIG. 8C, and therefore a level-3 (third level) hitting processing which is more favorable to the batter as compared with the level-2, for example, a processing of providing a higher batted-ball speed, will be set as the batting result. When the center distance is equal to less that the predetermined value approximately equal to zero (i.e., the centers are approximately aligned with each other), a processing which is more favorable to the batter as compared with the level-3, typically a processing of providing a home run, will be set as the batting result.

The batting result-setting section 307 is also operable, when the "location designation" is selected, to perform a processing of determining the batting result, based on the hitting level determined by the processing in FIG. 9, and a contact rate (%) corresponding to the overlapping degree between the mark images MG1, MG2.

With reference to FIG. 8, the contact rate (%) corresponding to the overlapping degree between the mark images MG1, MG2 in each of the levels-1, 2, 3 will be described below. In the level-1 where only the ring regions R12, R22 overlap each other as shown in FIGS. 8A and 8B, a percent value corresponding to the overlapping degree can be calculated by the following formula: $100\times[(La+Lb)-L_0]/[L_0-(Lc+Ld)]$, wherein $L_0$ is a center distance between the mark images MG1, MG2. That is, the value is zero % in the state illustrated in FIG. 8A, and 100% in the state illustrated in FIG. 8B. More specifically, in case where each of the mark images MG1, MG2 has the same shape, when the ring region 12 is in contact with the central circle region R21 of the other mark image, the ring region R22 is also in contact with the central circle region R11 of the other mark image. Thus, in this case, the value is determined to be 100%. In case where each of the mark images MG1, MG2 has a different shape, when the ring region 12 is in contact with the central circle region R21 of the other mark image, the ring region R22 is not in contact with the central circle region R11 of the other mark image. Thus, in this case, the value is determined to be less than 100%.

In the level-2 where at least one of the ring regions R12, R22 overlaps the central circle region of the other mark image as shown in FIGS. 8B and 8C, a percent value corresponding to the overlapping degree can be calculated by the following formula: $100\times[(La+Ld)-L_0]/(La-Lc)]$, wherein La>Lb, and $L_0$ is a center distance between the mark images MG1, MG2. That is, the value is zero % in the state illustrated in FIG. 8B, and 100% in the state illustrated in FIG. 8C.

In the level-3 where the mark images overlap each other in such a manner that the respective basis locations thereof are moved from the state illustrated in FIG. 8C to come closer to each other, a percent value corresponding to the overlapping degree can be calculated by the following formula: $100\times[(Lc+Ld)-L_0]/(Lc+Ld)$, wherein $L_0$ is a center distance between the mark images MG1, MG2. That is, the value is zero % in the state illustrated in FIG. 8(*b*), and 100% in the state illustrated in FIG. 8(*c*).

As above, while each of the levels-1, 2, 3 originally represents a level that the swung bat character can make a solid contact with the pitched ball character (i.e., can hit the pitched ball character clearly), a level of solid contact in each of the levels-1, 2, 3 is set in a continuously-variable manner or in a greater number of stages (than three stages in the levels-1, 2, 3), correspondingly to the mark-image overlapping degree, to produce higher realistic sensation. For example, the level of solid contact may be expressed by a power rate (0 to 100%) which determines a trajectory of a ball after being batted (i.e., batted-ball speed), wherein the level-1, the level-2 and the level-3 are set in the range of 20 to 40%, in the range of 50 to 70%, and in the range of 80 to 100%, respectively. In this case, when the mark-image overlapping degree is 50% in the level-1, the batted-ball speed is set to 30%. That is, a trajectory (i.e., batted-ball speed) of 30% of a hitting power of the batter character is given to the batted ball character. The levels divided in the above manner allow the batted-ball power (strength) to be reflected in a multistage manner, instead of being reflected on an entire level of the parameter in proportional relation.

Figure 10:
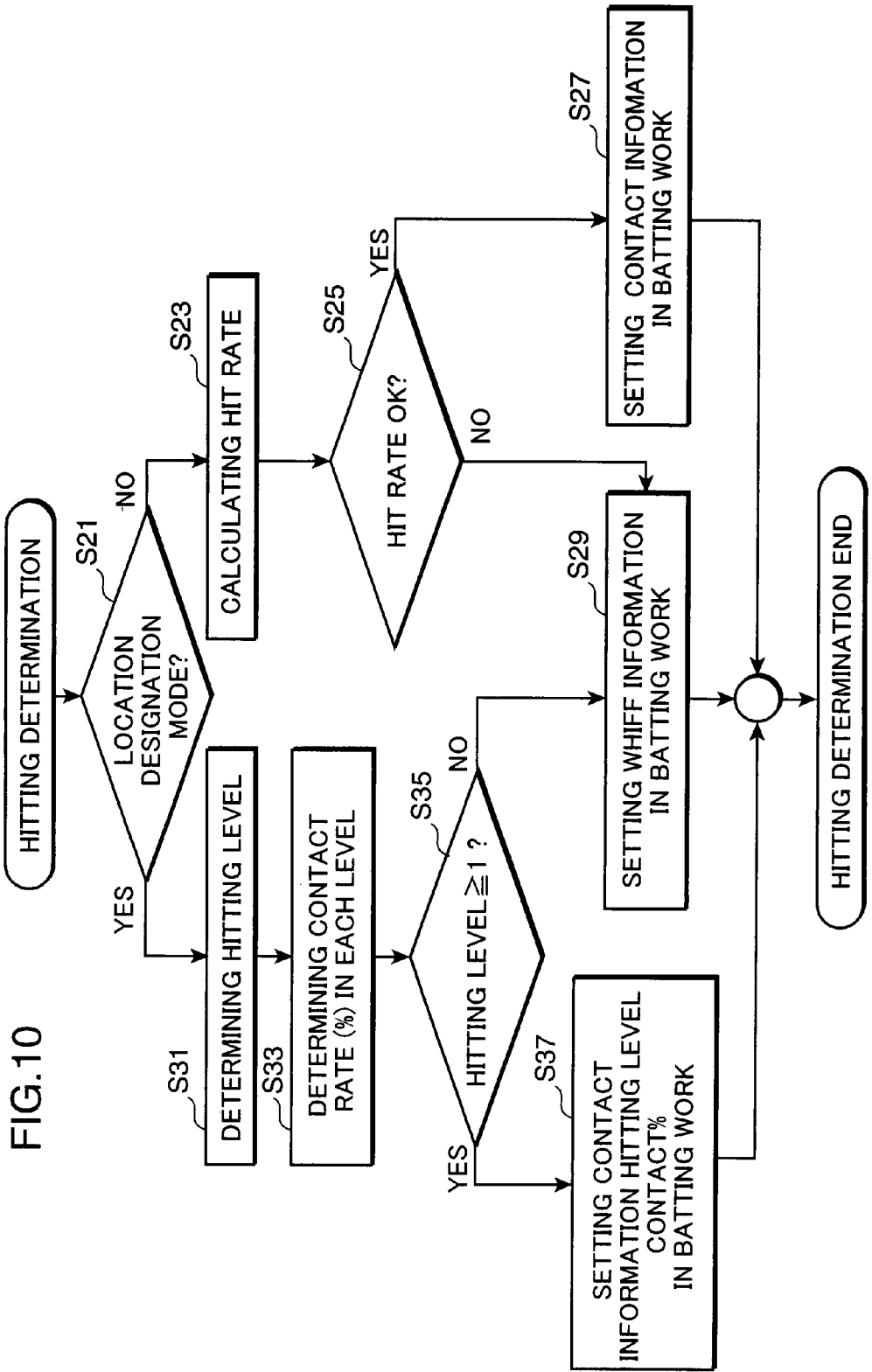
FIG. 10 is a flowchart showing one example of a hitting determination processing.
Figure 14:
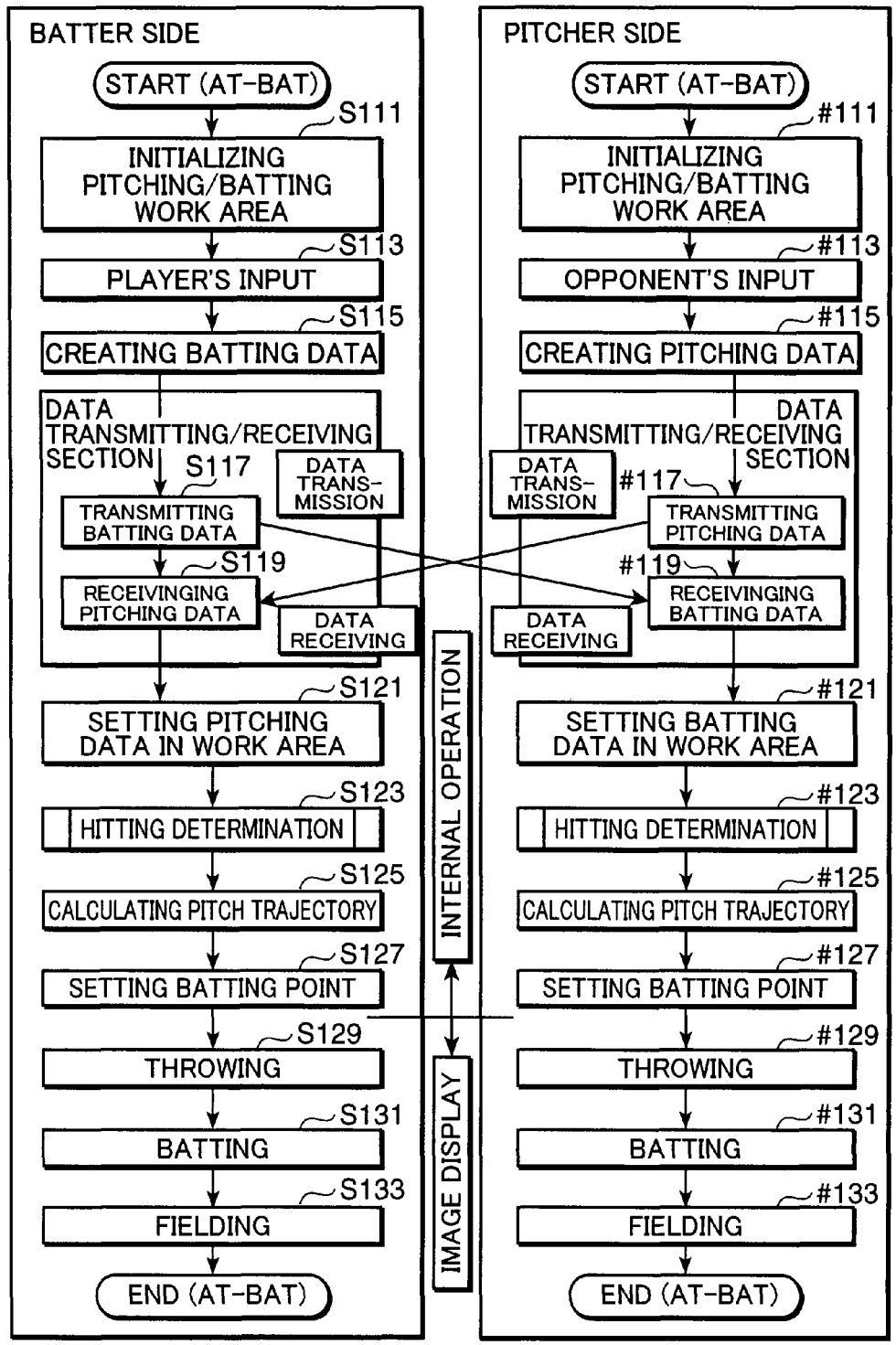
FIG. 14 is a flowchart showing a pitching/batting (at-bat) subroutine included in a sequence execution processing in Step S45 illustrated in FIG. 11.

FIG. 10 is a flowchart showing one example of the hitting determination processing (details of Step S123 in FIG. 14). In FIG. 10, it is determined whether the "location designation" button is selected on the image screen in FIG. 15. If the "location designation (course designation)" button is not selected, the subroutine will advance to Step S23 to perform a normal hit-rate calculation. Specifically, as mentioned above, a probability of making a hit by the pitcher character is calculated, based on the pitcher and batter parameters and the exchanged data between the player's and opponent's game apparatuses, and using a predetermined calculation formula, and it is determined whether the calculated probability (hit rate) is equal to or greater than a predetermined value (Step S25). If the hit rate reaches the predetermined value, a hitting processing corresponding to the hit rate will be set in a batting work area of the RAM 3002 (Step S27). When the hit rate does not reach the predetermined value, a whiff processing is set in the batting work area of the RAM 3002 (Step S29).

When the "location designation" button is selected on the image screen in FIG. 15, after performing the determination of the hitting level (Step S31) and the determination of the contact rate (%) (Step S33), it is determined whether the hitting level is equal to or higher than the level-1 (Step S35). If the hitting level does not reach the level-1, the whiff processing will be set in the batting work area of the RAM 3002 (Step S29). When the hitting level is equal to or higher than the level-1, information about the hitting, the hitting level and the contact rate (%) is set in the batting work area of the RAM 3002 (Step S37).

The frequency calculation section 308 is activated when the "location designation" button is selected. As shown in FIGS. 15 and 16, the strike zone image SZ is divided into nine subareas in vertical and horizontal directions, and each of the subareas is displayed in a predetermined display mode where a frequency level of location designation is indicated for each of the subareas based on a previous record (in this embodiment, respective colors are distinguished in a predetermined number of stages in such a manner that the colors becomes more reddish as the frequency increases, and preferably after being subjected to a processing for obtaining a semi-transparent image. In this case, the number of subareas is nine. Thus, the frequency may be divided into the following three ranges: 0 to 10%; 11 to 20%; and 21% or more, or the four ranges including an additional range of 31% or more. Alternatively, the frequency may be guided in the form of a ranking, or only a part of the subareas having a predetermined frequency value or more may be displayed in a different display mode from that for the remaining subareas. Information about the frequency of location designation is obtained by aggregating, on a subarea-by-subarea basis, all previous designated-location data (or a part of previous designated-location data corresponding to a predetermined number of recent games) of the player or opponent which is stored in the center server, and calculating a ratio of a designation member in each of the subareas to a total designation members. For example, instead of indicating the frequency for all the subareas, a frequency of location designation to each of plural groups of subareas divided by height, e.g., three groups consisting of high, middle and low locations, may be displayed in the above display mode having a predetermined number of stages.

The game state judgment section 309 has a game management function of managing a game state. Specifically, the game state judgment section 309 is operable to issue an instruction for data exchange of athlete parameters of each of a plurality of athlete cards 9 to be used in each of the player's and opponent's game apparatuses, at start of the game, and an instruction for transmitting/receiving of athlete parameters of a substitute athlete during change in the athlete character, and judge a game state (score, pinch, chance, etc.) based on the number of executed sequences, i.e., the number of innings or the number of outs in a baseball game, and an adjacent sequence execution result. When a result of the judgment is a predetermined special state (e.g., final inning) or a notable state (bases loaded), this state will be reflected on a batting result to be determined by the batting result-setting section 307, i.e., a processing of determining whether the batting result is hit or out. When the "location designation" button is selected, the above game state may be used as a parameter for setting the mark image, e.g., the respective widths of the ring regions R12, R22. This makes it possible to provide higher excitement to the game. Further, when the "location designation" button is selected, the game state judgment section 309 is operable to transmit data about the pitch or swing location to the center server in associated relation with the player.

The image display control section 302 in this embodiment is adapted to image an identical event from different viewpoint positions desirable for respective ones of pitcher and batter sides so as to provide enhanced visibility of game progression to each of pitcher-side and batter-side players, while it may be configured to display the same display image (i.e., display images which are same in a view point of a virtual camera and a direction of a sight line) on respective ones of pitcher-side and batter-side screen.

The unit-sequence execution section 310 is adapted to sequentially calculate respective movements of the pitcher character, the fielder character, the batter character and the base runner character during a series of actions in a process from pitching by the pitcher character through until a result of batting, and a movement of the ball character configured to simulate a ball, and sequentially lead the sequential calculation results to the image display control section 302.

The unit-sequence execution section 310 comprises a pre-processing section 311 and a post-processing section 312. The pre-processing section 311 is operable to obtain a processing result using a content of a determination by the action-setting section 305 and parameters used for the determination, before the pitcher character displayed on the monitor 3 throws the ball character. Specifically, when the player plays the game on the pitcher side, the pre-processing section 311 is operable to calculate respective data about a pitch location, a pitched-ball speed (using the "pitched-ball speed" and "ball release" in the pitcher parameters), a pitch type, a trajectory of a pitched ball and a ball-passing position above a home base. When a player plays the game on the batter side, the pre-processing section 311 is operable to calculate a trajectory of bat swing, whether the bat can hit the pitched-ball, and respective parameters of "batted-ball speed", "batted-ball angle" and "rate of decrease in batted-ball speed" at a moment when batted, when it is calculated that the bat can hit the pitched-ball. The respective trajectories of the pitched-ball character and the bat swing in the above calculations may be obtained in consideration of a commonly-used dynamics and air resistance, or may be obtained through a simulation-based calculation on the basis of a movement close to an actual movement and at a processing speed required for a game processing.

The post-processing section 312 is designed for a processing for an action to be performed after the pitching movement, and adapted to perform calculations for allowing a fielder character to have a natural defensive movement, relative to the movements of the ball character and the base runner character and allowing the base running character to have a natural base-running movement, relative to the movements of the ball character and the fielder character (according to a control program in conformity to the baseball rules), and perform a calculation for moving the ball character based on the data at the time when it is hit by the bat character. The post-processing section 312 is also operable to calculate a batted-ball speed and a batted-ball angle after hitting, in accordance with a misalignment and a time lag between respective ones of the passing position and timing of the ball character above the home base and the swing position and timing of the bat character, and by use of the respective parameters of the "batted-ball speed", the "batted-ball angle" and the "rate of decrease in batted-ball speed" obtained by the pre-processing section 311. In this calculation, the "batted-ball speed" and the "batted-ball angle" may be configured to provide variations in trajectory of the batted ball, using the random number generation section 308, so as to produce an enhanced realistic image.

The post-processing section 312 is operable to repeatedly perform the above calculation in a predetermined cycle and lead the obtained result to the image display control section 302 so as to dynamically display respective movements of the ball character, the pitcher character, the batter character, the fielder character and the base runner character on the monitor 3 to achieve more realistic sequence processing.

The athlete-card issue processing section 313 is operable, in response to termination of the game, to generate an instruction for issuing a predetermined number (in this embodiment, one) of athlete cards from the athlete card container in the housing 1 through the athlete card issue slot 6. Thus, a player can steadily collect a different type of athlete card every time he/she plays the game.

The ROM 3001 in the game apparatus pre-stores an athlete character image in a number enough to form one computer-controlled baseball team and respective parameters of athlete characters (pitcher parameters and fielder parameters). The opponent-side strategy setting section 314 serves as a means to achieve a competition between the CPU and a player, using a single of the game apparatus, and plays a roll of performing a processing of selecting the "location designation" item and the "sign" item, a processing of determining the attribute level and a batting result, and a processing of executing each sequence. Fundamentally, this opponent-side strategy setting section 314 is operable to activate the setup section 304 (second setup means), the action-setting section 305, the batting result-setting section 307, the frequency calculation section 308, the game state judgment section 309 and the unit-sequence execution section 310, in the player's game apparatus, in substantially the same manner as that in a situation where an opponent (or opponent's game apparatus) exists, and perform an processing of displaying an image on a single monitor FIG. 15 shows a game image at start of a sequence in case where the player plays the game on the batter side, and FIG. 16 shows a game image for guiding the designation of the pitch location in case where the player plays the game on the pitcher side. FIG. 17 shows a game image for guiding the designation of the swing location in case where the player plays the game on the batter side, and FIG. 18 shows a game image during a duel in a state when the player plays the game on the batter side, and the pitch location overlaps the swing location. FIG. 19 shows a game image during a duel in a state when the player plays the game on the pitcher side, and the pitch location overlaps the swing location. FIG. 20 shows a game image during a duel in case where the player plays the game on the batter side, and the pitch location and the swing location have no overlapping (i.e., whiff). As shown in FIGS. 16 to 20, in addition to the game image, an opponent (team name) and contents concerning a game progression state (score, inning, etc.) are displayed on an upper side of the image screen, and data about a pitcher and a batter dueling against each other is displayed on opposite lateral sides of the image screen. Further, a list of team members is displayed on a lower side of the image screen. The strike zone image SZ is displayed at a central position of the image screen. In this embodiment, the strike zone image SZ is divided into nine subareas, and opponent's data about the frequency of the location designation is displayed in each of the areas in a distinguishable manner, and the player's mark image MG1 (see FIGS. 16 and 17) or the player's and opponent's mark images MG1, MG2 (see FIGS. 18 to 20), is/are displayed together with the strike zone image SZ.

Figure 11:
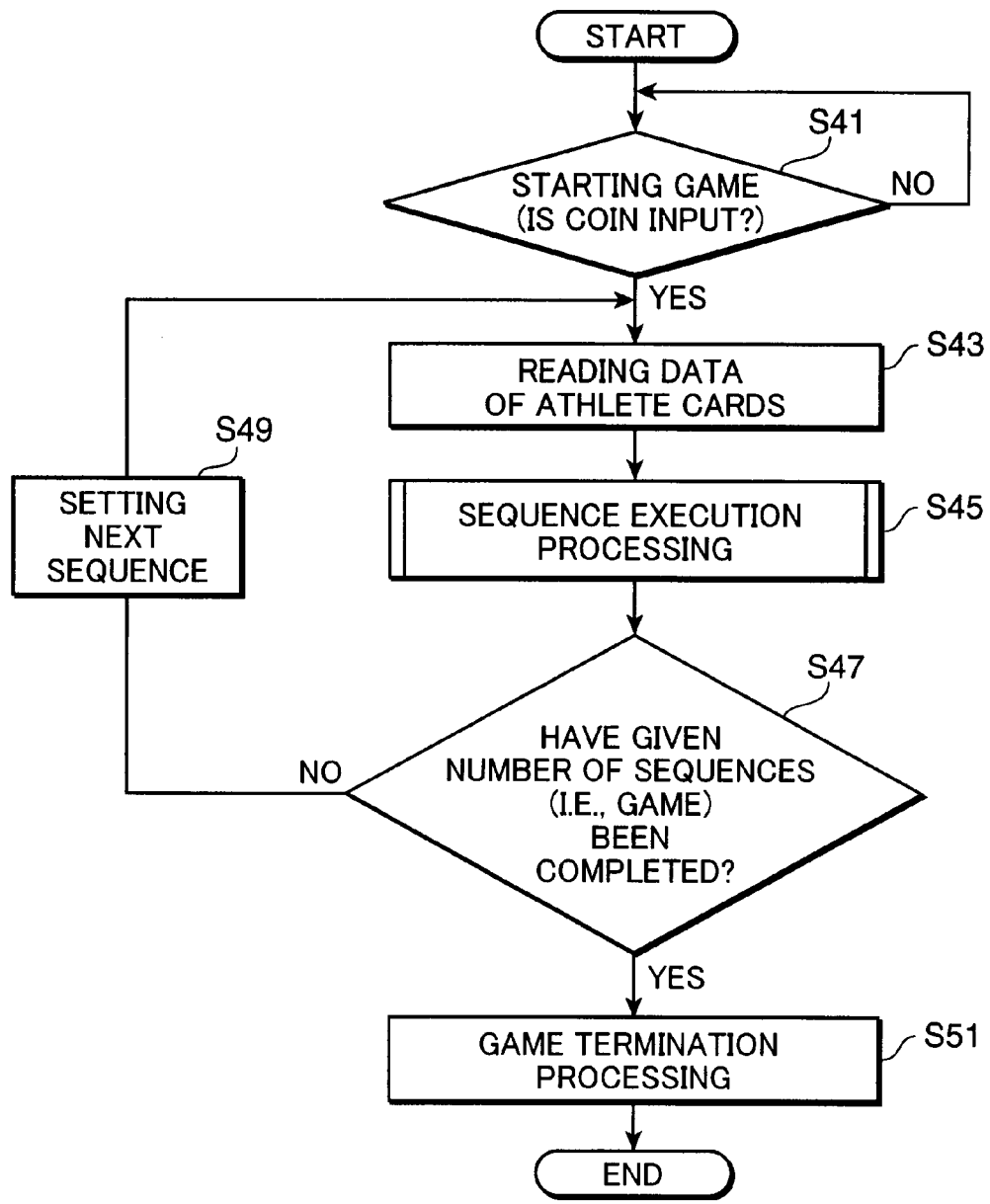
FIG. 11 is a flowchart showing a general flow of a game process.

FIG. 11 is a flowchart showing a general flow of a game process. Firstly, the coin sensor 81 detects whether a coin is input (Step S41). If YES, the image pickup section 11 is activated to detect that a required number (in a baseball game, nine) of athlete cards 9 are mounted on the mounting surfaces 20, and read athlete identification data of the respective athlete cards 9 (Step S43). Subsequently, after the game is initiated and data exchange with an opponent is performed, the routine advances to a processing of executing one sequence for a duel against one batter character (Step S45). Every time such a sequence is completed, it is determined whether the game is terminated (Step S47). When there is a remaining out or inning, another sequence for a duel against a next batter character is set, and the routine returns to Step S43. If it is determined in Step S47 that the game is terminated, a game termination processing, for example, of presenting superiority/inferiority (victory/defeat) on the monitor 3 is performed. Then, an instruction for issuing one new athlete card 9 is generated, and then this routine is terminated.

Figure 12:
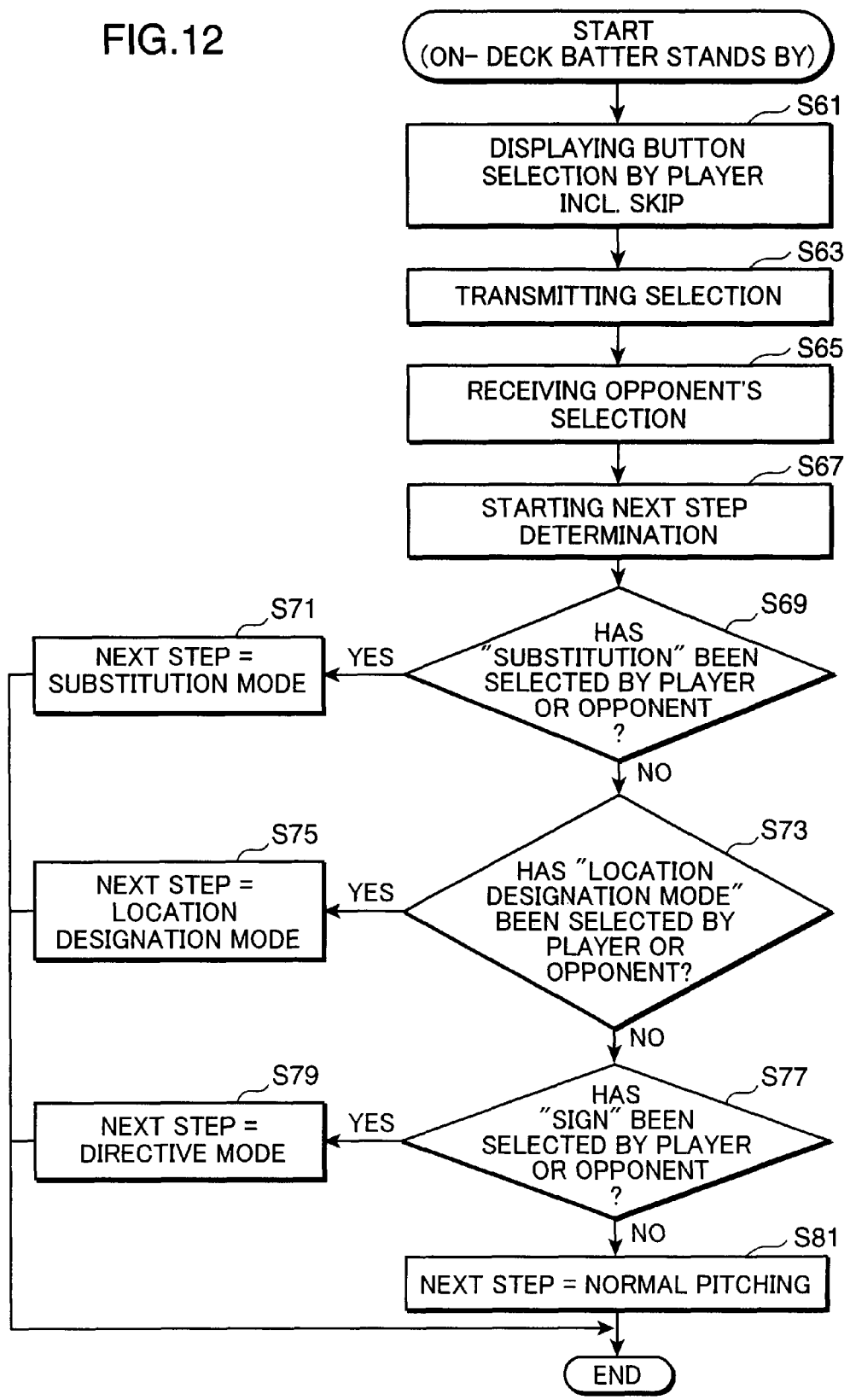
FIG. 12 is a flowchart for explaining a selection processing for an image screen illustrated in FIG. 15.

FIG. 12 is an explanatory flowchart of a processing for selection to the image screen illustrated in FIG. 15. The image screen in FIG. 15 represents the start of one sequence, wherein a batter warms up to be next at bat. The four buttons: "sign", "pinch hitter/pinch runner", "location designation" and "skip", are displayed on the image screen. In response to accepting information about selection of any one of the buttons (Step S61), the acceptance section 303 transmits the selection's content to the opponent's game apparatus (Step S63), and receives a content selected by an opponent from the opponent's game apparatus (Step S65). There is a difference between respective timings of the player's and opponent's selections. Thus, in the processings of transmitting/receiving the selection's contents, one of the game apparatuses where the selection is made at an earlier timing may perform the transmitting processing in first.

When the receiving of the opponent-side selection's content is completed, a step determination processing is performed (Step S67). Specifically, this selection subroutine in this embodiment is configured to set a priority to the "sign", "pinch hitter/pinch runner" and "location designation", and permit the player to select only one of these items. Firstly, it is determined whether the "substitution" (i.e., "pinch hitter/pinch runner") is selected by either one of the player and the opponent (Step S69). If the "substitution" is selected, the subroutine will advance to a substitution mode, wherein the image screen is switched to a predetermined image screen for guiding a substitution operation (Step S71). When the "substitution" is not selected, it is determined whether the "location designation" is selected by either one of the player and the opponent (Step S73). If the "location designation" is selected, the subroutine will advance to a location designation mode, wherein a processing of shifting to the image screen in FIG. 16 (or FIG. 17) and further to the image screen in FIG. 18 (or FIG. 19) or the image screen in FIG. 20, is performed (Step S75). When the "location designation" is not selected, it is determined whether the "sign" is selected by either one of the player and the opponent (Step S77). If the "sign" is selected, the subroutine will advance to a sign mode wherein the image screen is switched to a predetermined screen image where a plurality of buttons representing various types of signs are displayed to prompt a selection of the signs (Step S79). If the "skip" is selected, or none of the buttons is selected even after an elapse of a predetermined time (NO in Step S77), a sequence processing will be performed under contents of pitching and batting set by the computer, and an image screen for the sequence processing will be displayed (Step S81).

It is not guaranteed that each of the player and the opponent selects the same item (button) to the image screen in FIG. 15. On the assumption that each of the player and the opponent selects a different one of the buttons, the following priority is pre-set. If either one of the player and the opponent selects the "pinch hitter/pinch runner" button, the subroutine will advance to the substitution mode even if the other selects one of the remaining buttons. If either one of the player and the opponent selects the "location designation" button, the subroutine will advance to the location designation mode even if the other selects either one of the "sign" and "skip" buttons. If either one of the player and the opponent selects the "sign" button, the subroutine will advance to the sign mode even if the other selects the "skip" button.

Figure 13:
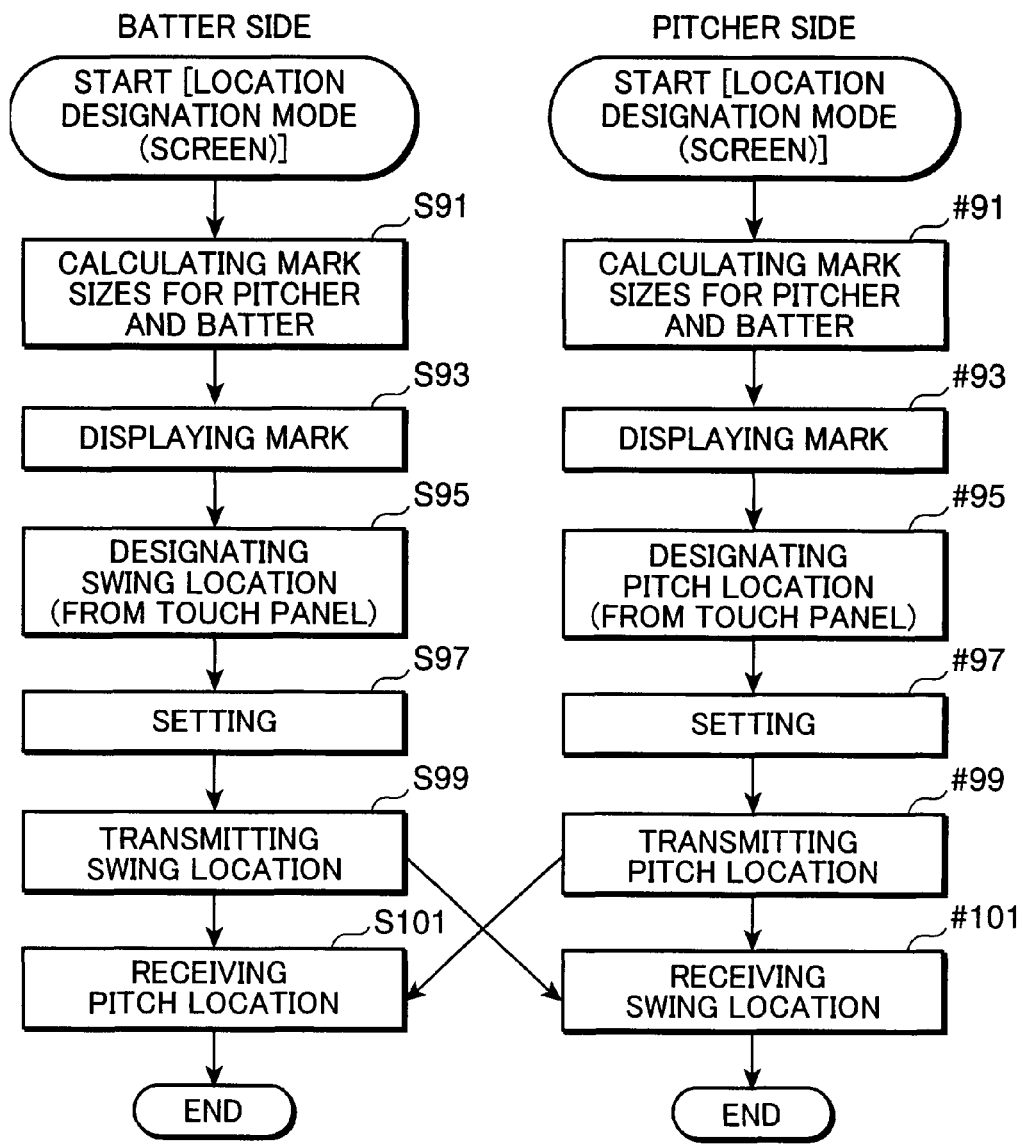
FIG. 13 is a flowchart showing a subroutine for a "location designation mode" in Step S75 illustrated in FIG. 12.

FIG. 13 shows a subroutine of the location designation mode selected in Step S75 illustrated in FIG. 12. The following description will be made on the assumption that the player plays the game on the offensive side, and the opponent plays the game on the defensive side. When the player plays the game on the defensive side (i.e., the opponent plays the game on the offensive side, the relationship between the batter and the pitcher may be simply reversed, and therefore description about this case will be omitted.

In response to shifting to the location designation mode, a size of the mark image MG1 for the batter character, i.e., the radius of the central circle region R11 and the width of the ring region R12, is set up, and a size of the mark image MG2 for the pitcher character (i.e., opponent's character), i.e., the radius of the central circle region R21 and the width of the ring region R22, is set up (Step S91). Then, only the player-side (i.e., batter-side) mark image MG1 is displayed in an appropriate position, e.g., in a central position, of the strike zone image SZ (Step S93). This allows the player to press a desired position of the strike zone image SZ through the touch panel 10 while visually checking the mark image MG1. When the player presses a desired position of the strike zone image SZ as a designated location, a processing of moving a center of the mark image MG1 to the pressed position is performed (Step S95). The operation of moving the mark image MG1 to the designated location may be achieved by a drag-and-drop operation for the mark image MG1. After determining the designated location, the player can press a set button illustrated in FIG. 17 to fix the designated location as a swing location (Step S97).

Subsequently, information about the determined swing location is transmitted to the opponent's game apparatus through the communication section 130 (Step S99), and information of a pitch location designated in the opponent's game apparatus is received (Step S101).

Then, the player's game apparatus calculates and sets up the central circle region R21 and the ring region R22 of the mark image MG2, based on data originally stored in the player's game apparatus and with reference to the pitcher parameters of the pitcher character (i.e., opponent's character) and a game state, and sends the pitch location information designated and received by/from the opponent's game apparatus, to the image display control section 302, so as to allow the mark image MG2 to be displayed together with the mark image MG1 on the monitor 3 of the player's game apparatus. A processing of displaying the mark image MG2 on the monitor is not performed in this flowchart, but, for example, in Step S123 illustrated in FIG. 14. As shown in FIGS. 16 and 17, an image representing the location-designation frequency of the opponent is also displayed in the strike zone image SZ. In the above manner, at least after the swing location is determined (fixed) in the player's game apparatus, the pitch location designated by the opponent is displayed through the information exchange. Thus, the player designates the swing location while predicting or sherlocking opponent's strategy or tactics based on only information of the opponent's location-designation frequency. This makes it possible to maintain excitement/enjoyment of the game at high level.

In the opponent's game apparatus which is operated by the opponent who plays the game on the pitcher side, a size of the mark image MG1 (defined from the side of the opponent' game apparatus) for the pitcher character, i.e., the radius of the central circle region R11 and the width of the ring region R12, is set up, and a size of the mark image MG2 for the batter character (i.e., the player's character which is the opponent's character as defined from the side of the opponent), i.e., the radius of the central circle region R21 and the width of the ring region R22, is set up (Step #91). Then, only the pitcher-side mark image MG1 is displayed in an appropriate position, e.g., in a central position, of the strike zone image SZ (Step #93). This allows the opponent to press a desired position of the strike zone image SZ through the touch panel 10 while visually checking the mark image MG1. When the opponent presses a desired position of the strike zone image SZ as a designated location, a processing of moving a center of the mark image MG1 to the pressed position is performed (Step #95). After determining the designated location, the opponent can press a set button illustrated in FIG. 16 to fix the designated location as a pitch location (Step #97).

Subsequently, information of the determined pitch location is transmitted to the player's game apparatus through the communication section 130 (Step #99), and information of the swing location designated in the player's game apparatus is received (Step #101).

Then, the opponent's game apparatus sets up the central circle region R21 and the ring region R22 of the mark image MG2, with reference to the batter's parameters and a game state, and sends information of the swing location designated and received by/from the player's game apparatus, to the image display control section 302 of the opponent's game apparatus, so as to allow the mark image MG2 to be displayed together with the mark image MG1 on the monitor 3 of the opponent's game apparatus. After determining the pitch location, the swing location designated by the player is displayed through the information exchange. Thus, the opponent designates the pitch location while predicting or sherlocking player's strategy or tactics. This makes it possible to maintain excitement/enjoyment of the game at high level.

FIG. 14 is a flowchart showing a pitching/batting subroutine included in the sequence execution processing in Step S45 illustrated in FIG. 11. The following description is firstly described about a subroutine to be executed when the player plays the game on the batter side. A subroutine to be executed when the player plays the game on the pitcher side is fundamentally the same as that in FIG. 14, and therefore a description therefor will be made about only a difference from the subroutine to be executed when the player plays the game on the batter side.

Firstly, data about a pitching/batting processing (work) executed in an adjacent sequence is initialized (Step S111). Then, a processing of accepting a result of player's selection of the items, such as "sign", and other information, is performed (Step S113). Player's input information to be accepted through this processing includes data about a card-mounted position of the athlete card 9 on each of the mounting surfaces 20.

Then, batting data to be transmitted to the opponent's game apparatus is created (Step S115). The created batting data is transmitted to the opponent's game apparatus (Step S117), and pitching data transmitted from the opponent's game apparatus is received (Step S119). This transmitting/receiving processings may be configured to be performed at a timing after an appropriate time required for the player to set tactics has elapsed from initiation of the batting processing, so as to allow the player's and opponent's game apparatuses to transmit the data mutually in an approximately the same time zone. Alternatively, each of the game apparatuses may be configured to permit an interrupt processing for receiving data, so that data just after creation thereof can be transmitted to the other game apparatus. Through this data exchange processing, each of the game apparatuses will have the same pitching and batting data. The game apparatuses having the same data can prevent an image from being displayed with a time lag therebetween so as to provide a game environment without a feeling of strangeness in the player and opponent and advantage/disadvantage in the player and opponent due to communication.

Then, the received pitching data is stored in a work area of the RAM 3002 (Step S121), and the batting result-setting section 307 performs the hitting determination based on the pitching data, the batting data and others (Step S123). In this hitting determination, a processing for a normal mode (including the case where only the "sign (directive)" item is selected" is performed.

In Step S125, a calculation for a trajectory of a pitched ball is performed using the pitching data. Then, a "batting point" which is a ball-passing position above a home base is obtained from the pitched-ball trajectory calculation, and set (stored) in the work area (Step S127). Subsequently, based on the result obtained from the pitched-ball trajectory calculation, a "pitching" image is displayed on the monitor 3 according to a pitching-movement/pitched ball processing (Step S129). Then, a swing timing, a batted-ball direction and a batted-ball speed as a result of the batting are calculated, and, based on these calculated data, a "batting" image is displayed on the monitor 3 according to a batting-movement/batted ball processing (Step S131). Then, in response to the batting result, respective movements of a fielder character, a base runner and a ball character are sequentially calculated and displayed as images on the monitor 3 (Step S133).

When the player plays the game on the pitcher side, the processings from Steps #111 to #133 are executed in synchronization with the processings from Steps S111 to S133. In Step #117, pitching data is transmitted. In Step #119, batting data is received.

In the present invention, the following modifications may be employed.

(1) While the game apparatus in the above embodiment is designed to change a mode of the game through means of the athlete cards 9 and based on a change in the card-mounted position, the present invention is not limited to this manner. For example, the athlete characters may be given team members which are pre-stored in the game apparatus, or may be team members which are designated from a large number of athlete characters stored in the game apparatus, or may be team members which are pre-stored in the game apparatus or designated from a large number of athlete characters stored in the game apparatus, and trained by a player through a training game or the like.

(2) Instead of the touch panel 10, the manual operation section may comprise a pointing device, such as a mouse or a joystick.

(3) While the game in the above embodiment is a simplified type where one sequence is processed with respect to each ball thrown by a pitcher, it may be configured in conformity to the baseball rules, or may be processed with respect to two pitches.

(4) In a player vs. CPU competition where one player competes against a built-in computer using a single game apparatus, the opponent-side strategy setting section 314 performs a control and image display as if the player competes against another player, i.e., an opponent. In this case, for example, in the hitting determination processings in Step S123 and Step #123, there is no information about the card-mounted position of the athlete card 9, and the computer can fully recognize manipulation information of the player. Considering these situations, a determination processing unique to the player vs. CPU competition is included. Thus, when the processings in Step S123 and Step #123 is initiated, the processings may be separated from each other depending on whether the competition is the normal competition using two game apparatuses or the player vs. CPU competition, so as to be executed in unique algorithms, respectively. After the separate processings, the routine may advance to the next step.

(5) The shape of the mark image is not limited to a circular shape, but may be a polygonal shape, such as a quadrangular shape. In this case, ability data may be reflected on each apex. Further, the shape may be an oval shape in place of a circular shape.

(6) In the above embodiments, the batting result is set as the batted-ball trajectory (speed and strength of a batted ball), and the determination on hit/out (except whiff) relies upon the subsequent calculation. Alternatively, the game apparatus may be configured to obtain a batting result including the determination on hit/out.

(7) While the game in the above embodiment has been described based on a roll-playing game between a pitcher (defensive) side and a batter (offensive) side, configured to simulate baseball, the game in the present invention is not limited to a baseball game, but the present invention may be applied to any other suitable competition game where a player's character and an opponent's character play rolls of defensive and offensive sides through a game media, such as a competition game configured to simulate penalty shootout in a soccer game between a shoot-side (offensive-side) and a keeper-side (defensive-side), a competition game configured to simulate a fight game between a punching-side (offensive-side) and a dodging-side (defensive-side), or a competition game configured to simulate a shooting game between a shooting (e.g., gun shooting)-side (offensive-side) and a dodging-side (defensive-side).

As mentioned above, the present invention provides a game system comprising game-progression processing means operable, according to communication about manipulation information between a plurality of game apparatuses each equipped with a manual operation section manipulatable from outside, a display unit and communication means, via a network, to progress a completion-type role-playing game configured to allow a player's character and an opponent's character displayed on the display unit in each of the game apparatuses to alternately play on offensive and defensive sides through a game medium. In this game system, each of the game apparatuses includes: area-graphic display control means adapted to display, on the display unit, an area graphic having a predetermined shape which virtually represents a predetermined range in a game space; setup means adapted, based on manipulation information accepted from the manual operation section, to set up one of offensive and defensive locations within the area graphic, and set up a shape of a first mark image on the basis of the setup location; mark display control means adapted to display, onto the area graphic, the first mark image set up by the setup means, and, after completion of the setup processing by the setup means, display, onto the area graphic, a second mark image which is received from the opponent's game apparatus through the communication means, and set up in a predetermined shape on the basis of the other one of the offensive and defensive locations which is set up in the area graphic; and competition result-setting means adapted to set a competition result depending on a degree of overlapping between the first and second mark images.

The present invention also provide a game progression control method for progressing a completion-type role-playing game according a computer in each of a plurality of game apparatuses which is equipped with a manual operation section manipulatable from outside, a display unit and communication means, and connected to a network in such a manner as to allow communication about manipulation information therebetween, wherein the role-playing game is configured to allow a player's character and an opponent's character displayed on the display unit in each of the game apparatuses to alternately play on offensive and defensive sides through a game medium. The game progression control method comprises: displaying, on the display unit, an area graphic having a predetermined shape which virtually represents a predetermined range in a game space, through area-graphic display control means in each of the game apparatuses; based on manipulation information accepted from the manual operation section, setting up one of offensive and defensive locations within the area graphic, and setting up a shape of a first mark image on the basis of the setup location, through setup means in each of the game apparatuses; displaying, onto the area graphic, the first mark image set up by the setup means, and, after completion of the setup processing by the setup means, displaying, onto the area graphic, a second mark image which is received from the opponent's game apparatus through the communication means, and set up in a predetermined shape on the basis of the other one of the offensive and defensive locations which is set up in the area graphic, through mark display control means in each of the game apparatuses; and setting a competition result depending on a degree of overlapping between the displayed first and second mark images, through competition result-setting means in each of the game apparatuses.

Preferably, in the game system or the game progression control method of the present invention, the role-playing game is configured to simulate a baseball in such a manner that a pitcher character throws a ball character configured to simulate a ball so as to serve as the game medium, and a batter character swings a bat character configured to simulate a bat. In this case, the area graphic is configured to virtually represent an area corresponding to a strike zone above a home base in the game space. The offensive location is a swing location for the bat character within the area graphic, and the defensive location is a pitch location for the ball character within the area graphic. Further, the competition result is a batting result.

In the game system or the game progression control method of the present invention, each of the game apparatuses is equipped with the manual operation section manipulatable from outside, the display unit and the communication means. The game apparatuses are connected to a network in such a manner as to allow communication about manipulation information therebetween, and a completion-type role-playing game configured to allow a player's character and an opponent's character displayed on the display unit according to a computer in each of the game apparatuses to alternately play on offensive and defensive sides through the game medium, e.g., a game configured to simulate a baseball, is progressed. The area-graphic display control means in the player's game apparatus is operable to display, on the display unit, the area graphic having a predetermined shape which virtually represents a predetermined range in a game space. Then, the setup means in the player's game apparatus is operable, based on manipulation information accepted from the manual operation section, to set up one of offensive and defensive locations (in a baseball game, the defensive location means a position above a home base through which a pitched ball character will pass, and the offensive location means a position above the home base through which a swung bat character will pass) within the area graphic, and set up a shape of the first mark image on the basis of the setup location.

Then, the mark display control means in the player's game apparatus is operable to display, onto the area graphic, the first mark image set up by the setup means, and, after completion of the setup processing by the setup means, display, onto the area graphic, the second mark image which is received from the opponent's game apparatus through the communication means, and set up in a predetermined shape on the basis of the other one of the offensive and defensive locations (in the baseball game, a swing location and a pitch location) which is set up in the area graphic. Then, the competition result-setting means in the player's game apparatus adapted is operable to set a competition result (in the baseball game, a batting result) depending on a degree of overlapping between the first and second mark images. As above, the competition result is set depending on a degree of detected overlapping between the first mark image and the second mark image. Thus, prediction (sherlocking) about location designated by an opponent provides enhanced excitement/enjoyment. In addition, as compared with the conventional game system, the competition result (in the baseball game, a batting result) can be more precisely set to provide a realistic game capable of keeping players interested.

As to the processing of displaying the second mark image, the following technique may be employed. The setup means may be configured to set up a display position of the first mark image on the display unit, and set up respective shapes of the first and second mark images (in this case, the player's game apparatus receives only data about a display position of the second mark image through the communication means). Alternatively, the setup means may be configured to set up only a display position and a shape of the first mark image. In this case, (the setup means of) the opponent's game apparatus may be configured to set up a display position and a shape of the second mark image, and the player's game apparatus may be configured to receive the above processed data about the second mark image through the communication means, and send the received data to the mark display control means so as to display the second mark image on the display unit.

A game player (player or opponent) can set (i.e., designate) a pitch location within an area corresponding to a strike zone (this area includes a strike zone, and an area slightly less or slightly greater than the strike zone by a predetermined size). Thus, the pitch position can be realistically set in an adequately limited range, and therefore a game player who plays the game on a batter side can set a swing location under the condition that a prediction range is not unnecessarily expanded. This makes it possible to provide a realistic baseball game.

Preferably, the manual operation section is a panel-shaped touch sensor superimposed on a screen of the display unit. According to this feature, an offensive or defensive location can be designated only by pressing an intended position within the area graphic displayed on the image screen. Thus, a game player can designate the offensive or defensive location at an intended position reliably and accurately.

Preferably, each of the game apparatuses includes ability-data storage means adapted to store ability data about one or more abilities of each of the player's and opponent's characters concerning a completion of the game, wherein the game-progression processing means is operable to move the player's character based on the ability data, and the setup means is operable to set up a size of the first mark image based on the ability data of the player's character, and set up a size of the second mark image based on the ability data of the opponent's character. According to this feature, a size of a predetermined shape of each of the first and second mark images is not set at a fixed value but variably set depending on ability data of a corresponding one of the player's and opponent's characters. This makes it possible to provide a game having full of variety.

Preferably, each of the game apparatuses includes game management means adapted to manage a game progression state, wherein the setup means is operable to adjust respective sizes of the first and second mark images depending on the game progression state. According to this feature, a size of a predetermined shape of each of the first and second mark images is not set at a fixed value but variably set depending on a game progression state. This makes it possible to provide a game having full of variety. For example, in a game configured to simulate a baseball, the game progression state includes the n-th inning, the number of outs and base loaded.

Preferably, the competition result-setting means is adapted to determine a degree of overlapping between the first and second mark images, wherein the competition result-setting means is operable, when the first and second mark images overlap each other, to perform an offensive processing depending on the overlapping degree, and, when the first and second mark images have no overlapping, to perform a failed-offensive processing. According to this feature, the first and second mark images each having a predetermined shape overlap with each other at a certain degree, and this overlapping degree is determined. When the first and second mark images overlap each other, the offensive processing (in a baseball game, a hitting processing) depending on the overlapping degree is performed. When the first and second mark images have no overlapping, the failed-offensive processing (in the baseball game, a strikeout or whiff processing) is performed.

Preferably, each of the first and second mark images has a circular shape with a center at the basis location and a predetermined radius. According to this feature, when an offensive or defensive location is designated, a circular mark image having a predetermined radius is displayed on the basis of the designated location. This allows a game player to readily recognize the basis location. Further, in a process of changing a size of the first or second mark image, the size can be readily changed by variably setting a radius of the circular shape.

Preferably, the setup means is operable to define the first mark image by a double circle having an inner central circle region and an outer ring region, while setting up at least one of a radius of the inner central circle region and a width of the outer ring region, based on the ability data of the player's character, and define the second mark image by a double circle having an inner central circle region and an outer ring region, while setting up at least one of a radius of the inner central circle region and a width of the outer ring region, based on the ability data of the opponent's character. According to this feature, when at least one of the radius of the inner central circle region and the width of the outer ring region is variably set based on the ability data, a degree of overlapping between the inner central circle region/outer ring region of the first mark image and the inner central circle region/outer ring region of the second mark image will be changed. This overlapping degree can be reflected on a competition result.

Preferably, each of the inner central circle region and the outer ring region in each of the first and second mark images is displayed in a predetermined display mode. According to this feature, a game player can visually recognize the inner central circle region and the outer ring region.

Preferably, the competition result-setting means is operable, when the respective outer ring regions of the first and second mark images have no overlapping, to perform a failed-offensive processing, and, when at least the respective outer ring regions of the first and second-mark images overlap each other, to perform an offensive processing in such a manner as to provide more favorable conditions to an offensive side as a degree of the overlapping is increased. According to this feature, when the respective outer ring regions of the first and second mark images have no overlapping, the failed-offensive processing is performed. When at least the respective outer ring regions of the first and second mark images overlap each other, typically, when only he respective outer ring regions overlap each other, or when the inner central circle region and the outer ring region overlap each other, or when the respective inner central circle regions overlap each other, the offensive processing is performed in such a manner as to provide more favorable conditions to an offensive side as a degree of the overlapping is increased. This makes it possible to provide a game having enhanced excitement/enjoyment in prediction (sherlocking) about location designated by an opponent.

Preferably, the competition result-setting means is operable, when the respective outer ring regions of the first and second mark images overlap each other, to perform the offensive processing at least at a first level. Further, the competition result-setting means is operable, when the inner central circle region of either one of the first and second mark images and the outer ring region of the other mark image overlap each other, to perform the offensive processing at least at a second level which is more favorable to the offensive side as compared with the first level, and, when the respective inner central circle regions of the first and second mark images overlap each other, to perform the offensive processing at a third level which is more favorable to the offensive side as compared with the second level. According to this feature, a level of favorable conditions to the offensive side (in the baseball game, each of the level-1 hitting processing, the level-2 hitting processing stronger than the level-1, and the level-3 hitting processing stronger than the level-2) is changed depending on the degree of overlapping between the first and second mark images. This makes it possible to provide a game in which each of player's and opponent's predictions is reflected on a competition result in a segmented manner.

Preferably, each of the apparatuses includes means adapted to divide the area graphic into a plurality of subareas, and calculate a frequency of designation of the basis location in each of the subareas, wherein the area-graphic display control means is operable to display each of the subareas in a display mode associated with the designation frequency. According to this feature, an opponent's tendency of location designation can be figured out, and used for predicting a next opponent's tactic. This makes it possible to provide a game having enhanced excitement/enjoyment in prediction (sherlocking) about location designation.

Preferably, the area graphic has a quadrangular shape, wherein the plurality of subareas are defined by dividing the quadrangular shape in vertical and horizontal directions. According to this feature, the prediction about the offensive or defensive location can be performed by factors of "mid", "inside", "outside", "high" and "low".

In the game apparatus for use in the above game system, a player can operate (manipulate) one of a plurality of the game apparatuses to play the game against an opponent who operates (manipulates) one of the remaining game apparatuses.

Preferably, a computer program product for controllably progressing a completion-type role-playing game according a computer in each of a plurality of game apparatuses which is equipped with a manual operation section manipulatable from outside, a display unit and communication means, and connected to a network in such a manner as to allow communication about manipulation information therebetween, wherein the role-playing game is configured to allow a player's character and an opponent's character displayed on the display unit in each of the game apparatuses to alternately play on offensive and defensive sides through a game medium, may be configured as follows.

A computer program product comprises a program code and a code storage medium storing the program code thereon, wherein the program code is configured to cause a compute to execute the steps of: displaying, on the display unit, an area graphic having a predetermined shape which virtually represents a predetermined range in a game space, through area-graphic display control means; based on manipulation information accepted from the manual operation section, setting up one of offensive and defensive locations within the area graphic, and setting up a shape of a first mark image on the basis of the setup location, through setup means; displaying, onto the area graphic, the first mark image set up by the setup means, and, after completion of the setup processing by the setup means, displaying, onto the area graphic, a second mark image which is received from the opponent's game apparatus through the communication means, and set up in a predetermined shape on the basis of the other one of the offensive and defensive locations which is set up in the area graphic, through mark display control means; and setting a competition result depending on a degree of overlapping between the displayed first and second mark images, through competition result-setting means.

This computer program product can also introduce a distinctive feature into each of a processing of designating offensive and defensive locations and a processing of determining a competition result so as to provide a game having a high level of playability.

The present invention further provide a game apparatus equipped with a manual operation section, a display unit and a built-in computer, and designed to display, on the display unit, a player's character configured to be moved based on manipulation information accepted from the manual operation section, and an opponent's character configured to be moved according to control of the computer, and progress a completion-type role-playing game configured to allow the player's and opponent's characters to alternately play on offensive and defensive sides through a game medium. The game apparatus comprises: area-graphic display control means adapted to display, on the display unit, an area graphic having a predetermined shape which virtually represents a predetermined range in a game space; first setup means adapted, based on manipulation information accepted from the manual operation section, to set up one of offensive and defensive locations within the area graphic, and set up a shape of a first mark image on the basis of the location set up by the first setup means; second setup means adapted, according to control of the computer, to set up the other location within the area graphic, and set up a shape of a second mark image on the basis of the location set up by the second setup means; mark display control means adapted to display, onto the area graphic, the first mark image set up by the first setup means, and, after completion of the setup processing by the second setup means, display, onto the area graphic, the second mark image set up by the second setup means; and competition result-setting means adapted to set a competition result depending on a degree of overlapping between the first and second mark images.

In this game apparatus of the present invention, a competition game, e.g., a baseball game, can be performed between a player's character manipulated by a player and an opponent's character (so-called CPU's character) controlled by a built-in computer of the game apparatus. That is, a game player can enjoy the game by himself/herself using a single game apparatus.

In this specification, an element or component described as means for achieving a certain function is not limited to a structure or configuration described in this specification to achieve the certain function, but includes any other structure or configuration, such as a unit, component or element, capable of achieving the certain function.

INDUSTRIAL APPLICABILITY

In the game system of the present invention, a first mark image having a predetermined shape set up on the basis of one of offensive and defensive locations which is designated by a player, and a second mark image having a predetermined shape set up on the basis of the other location designated in an opponent's game apparatus by an opponent and received by a player's game apparatus through the communication means of the player's and opponent's game apparatuses, are displayed to an area graphic in a game space on the display unit. A degree of overlapping between the first and second mark images are detected, and a competition result is set depending on the detected overlapping degree. Thus, prediction (sherlocking) about location designated by an opponent provides enhanced excitement/enjoyment. In addition, as compared with the conventional game system, the competition result can be more precisely set to provide a realistic game capable of keeping players interested.

What is claimed is:

1. A game system comprising game-progression processing means operable, according to communication about manipulation information between a plurality of game apparatuses each equipped with a manual operation section manipulatable from outside, a display unit and communication means, via a network, to progress a completion-type role-playing game configured to allow a player's character and an opponent's character displayed on said display unit in each of said game apparatuses to alternately play on offensive and defensive sides through a game medium, wherein each of said game apparatuses includes:

area-graphic display control means adapted to display, on said display unit, an area graphic having a predetermined shape which virtually represents a predetermined range in a game space;

setup means adapted, based on manipulation information accepted from said manual operation section, to set up one of offensive and defensive locations within said area graphic, and set up a shape of a first mark image on the basis of said setup location;

mark display control means adapted to display, onto said area graphic, said first mark image set up by said setup means, and, after completion of said setup processing by said setup means, display, onto said area graphic, a second mark image which is received from the opponent's game apparatus through said communication means, and set up in a predetermined shape on the basis of the other one of said offensive and defensive locations which is set up in said area graphic; and competition result-setting means adapted to set a competition result depending on a degree of overlapping between said first and second mark images.

2. The game system as defined in claim 1, wherein said role-playing game is configured to simulate a baseball in such a manner that a pitcher character throws a ball character configured to simulate a ball so as to serve as said game medium, and a batter character swings a bat character configured to simulate a bat, wherein:

said area graphic is configured to virtually represent an area corresponding to a strike zone above a home base in said game space;

said offensive location is a swing location for said bat character within said area graphic;

said defensive location is a pitch location for said ball character within said area graphic; and said competition result is a batting result.

3. The game system as defined in claim 1, wherein said manual operation section is a panel-shaped touch sensor superimposed on a screen of said display unit.

4. The game system as defined in claim 1, further comprising ability-data storage means adapted to store ability data about one or more abilities of each of the player's and opponent's characters concerning a completion of said game, wherein:

said game-progression processing means is operable to move the player's character based on said ability data; and said setup means is operable to set up a size of said first mark image based on the ability data of the player's character, and set up a size of said second mark image based on the ability data of the opponent's character.

5. The game system as defined in claim 1, further comprising game management means adapted to manage a game progression state, wherein said setup means is operable to adjust respective sizes of said first and second mark images depending on said game progression state.

6. The game system as defined in claim 1, wherein said competition result-setting means is adapted to determine a degree of overlapping between said first and second mark images, said competition result-setting means being operable, when said first and second mark images overlap each other, to perform an offensive processing depending on said overlapping degree, and, when said first and second mark images have no overlapping, to perform a failed-offensive processing.

7. The game system as defined in claim 1, wherein each of said first and second mark images has a circular shape with a center at the basis location and a predetermined radius.

8. The game system as defined in claim 4, wherein said setup means is operable to define said first mark image by a double circle having an inner central circle region and an outer ring region, while setting up at least one of a radius of said inner central circle region and a width of said outer ring region, based on the ability data of the player's character, and define said second mark image by a double circle having an inner central circle region and an outer ring region, while setting up at least one of a radius of said inner central circle region and a width of said outer ring region, based on the ability data of the opponent's character.

9. The game system as defined in claim 6, wherein each of said inner central circle region and said outer ring region in each of said first and second mark images is displayed in a predetermined display mode.

10. The game system as defined in claim 8, wherein said competition result-setting means is operable, when the respective outer ring regions of said first and second mark images have no overlapping, to perform a failed-offensive processing, and, when at least the respective outer ring regions of said first and second mark images overlap each other, to perform an offensive processing in such a manner as to provide more favorable conditions to an offensive side as a degree of said overlapping is increased.

11. The game system as defined in claim 10, wherein said competition result-setting means is operable, when the respective outer ring regions of said first and second mark images overlap each other, to perform said offensive processing at least at a first level, said competition result-setting means being further operable, when the inner central circle region of either one of said first and second mark images and the outer ring region of the other mark image overlap each other, to perform said offensive processing at least at a second level which is more favorable to the offensive side as compared with said first level, and, when the respective inner central circle regions of said first and second mark images overlap each other, to perform said offensive processing at a third level which is more favorable to the offensive side as compared with said second level.

12. The game system as defined in claim 1, further comprising means adapted to divide said area graphic into a plurality of subareas, and calculate a frequency of designation of the basis location in each of said subareas, wherein said area-graphic display control means is operable to display each of said subareas in a display mode associated with said designation frequency.

13. The game system as defined in claim 12, wherein said area graphic has a quadrangular shape, wherein said plurality of subareas are defined by dividing said quadrangular shape in vertical and horizontal directions.

14. A game apparatus for use in a game system comprising the game apparatus; at least one other game apparatus; and a game progression processor that determines game progression of a completion-type role-playing game between a player and an opponent based on manipulation information received via a network from the game apparatus and at least another game apparatus, wherein a player's character and an opponent's character alternately play on offensive and defensive sides through a game medium, wherein said game apparatus comprises:

a manual operation section manipulatable from outside by the player and which generates said manipulation information of the game apparatus;

a display unit;

a communication means;

area-graphic display control means adapted to display, on said display unit, an area graphic having a predetermined shape which virtually represents a predetermined range in a game space;

setup means adapted, based on manipulation information accepted from said manual operation section, to set up one of offensive and defensive locations within said area graphic, and set up a shape of a first mark image on the basis of said setup location;

mark display control means adapted to display, onto said area graphic, said first mark image set up by said setup means, and, after completion of said setup processing by said setup means, display, onto said area graphic, a second mark image which is received from the opponent's game apparatus through said communication means, and set up in a predetermined shape on the basis of the other one of said offensive and defensive locations which is set up in said area graphic; and competition result-setting means adapted to set a competition result depending on a degree of overlapping between said first and second mark images.

15. A game progression control method for progressing a completion-type role-playing game according a computer in each of a plurality of game apparatuses which is equipped with a manual operation section manipulatable from outside, a display unit and communication means, and connected to a network in such a manner as to allow communication about manipulation information therebetween, said role-playing game being configured to allow a player's character and an opponent's character displayed on said display unit in each of said game apparatuses to alternately play on offensive and defensive sides through a game medium, said game progression control method comprising:

displaying, on said display unit, an area graphic having a predetermined shape which virtually represents a predetermined range in a game space, through area-graphic display control means in each of said game apparatuses;

based on manipulation information accepted from said manual operation section, setting up one of offensive and defensive locations within said area graphic, and setting up a shape of a first mark image on the basis of said setup location, through setup means in each of said game apparatuses;

displaying, onto said area graphic, said first mark image set up by said setup means, and, after completion of said setup processing by said setup means, displaying, onto said area graphic, a second mark image which is received from the opponent's game apparatus through said communication means, and set up in a predetermined shape on the basis of the other one of said offensive and defensive locations which is set up in said area graphic, through mark display control means in each of said game apparatuses; and setting a competition result depending on a degree of overlapping between said displayed first and second mark images, through competition result-setting means in each of said game apparatuses.

16. A game apparatus equipped with a manual operation section, a display unit and a built-in computer, and designed to display, on said display unit, a player's character configured to be moved based on manipulation information accepted from said manual operation section, and an opponent's character configured to be moved according to control of said computer, and progress a completion-type role-playing game configured to allow said player's and opponent's characters to alternately play on offensive and defensive sides through a game medium, said game apparatus comprising:

area-graphic display control means adapted to display, on said display unit, an area graphic having a predetermined shape which virtually represents a predetermined range in a game space;

setup means adapted, based on manipulation information accepted from said manual operation section, to set up one of offensive and defensive locations within said area graphic, and set up a shape of a first mark image on the basis of said location set up by said setup means;

auto setup means adapted, according to control of said computer, to set up the other location within said area graphic, and set up a shape of a second mark image on the basis of said location set up by said auto setup means;

mark display control means adapted to display, onto said area graphic, said first mark image set up by said setup means, and, after completion of said setup processing by said auto setup means, display, onto said area graphic, said second mark image set up by said auto setup means; and competition result-setting means adapted to set a competition result depending on a degree of overlapping between said first and second mark images.

17. A game progression control method for progressing a completion-type role-playing game according a computer in each of a plurality of game apparatuses which is equipped with a manual operation section manipulatable from outside, a display unit and communication means, and connected to a network in such a manner as to allow communication about manipulation information therebetween, said role-playing game being configured to allow a player operating one game apparatus and an opponent operating another game apparatus to alternately play on offensive and defensive sides through a game medium, said game progression control method comprising:

displaying, on said display unit of each of said one game apparatus and another game apparatus, an area graphic having a predetermined shape which virtually represents a predetermined range in a game space;

based on manipulation information accepted from said manual operation section of said one game apparatus, setting up an offensive location within said area graphic, and setting up a shape of a first mark image on the basis of said setup location, through setup means in said one game apparatus;

displaying onto said area graphic of said one game apparatus, said first mark image;

based on manipulation information accepted from said manual operation section of said another game apparatus, setting up a defensive location within said area graphic, and setting up a shape of a second mark image on the basis of said setup location, through setup means in said another game apparatus;

displaying onto said area graphic of said another game apparatus, said second mark image;

after completion of said setting up and first mark image displaying at said one game apparatus, displaying, onto said area graphic, said second mark image which is received from said another game apparatus through said communication means;

after completion of said setting up and second mark image displaying at said another game apparatus, displaying, onto said area graphic, said first mark image which is received from said one game apparatus through said communication means; and after said displaying of said first mark image and second mark image setting a same competition result, respectively, at each of said one game apparatus and said another game apparatus by a competition result-setting means in each of said one game apparatus and said another game apparatus, said competition result determined based only on a degree of overlap between said first mark image and second mark image.

* * * * *